US00RE43448E

(19) United States
(12) Reissued Patent
Kimoto et al.

(10) Patent Number: US RE43,448 E
(45) Date of Reissued Patent: Jun. 5, 2012

(54) MULTIFUNCTION PERIPHERAL WITH TEMPLATE REGISTRATION AND TEMPLATE REGISTRATION METHOD

(75) Inventors: Yuko Kimoto, Yokohama (JP); Naoki Hoshino, Ageo (JP)

(73) Assignees: Kabushiki Kaisha Toshiba, Tokyo (JP); Toshiba Tec Kabushiki Kaisha, Tokyo (JP)

(21) Appl. No.: 12/822,098

(22) Filed: Jun. 23, 2010

Related U.S. Patent Documents

Reissue of:
(64) Patent No.: 7,532,837
Issued: May 12, 2009
Appl. No.: 11/373,000
Filed: Mar. 9, 2006

(51) Int. Cl.
*G03G 15/00* (2006.01)

(52) U.S. Cl. ..... 399/81

(58) Field of Classification Search ..... 399/81, 399/82, 85; 358/1.13, 1.15, 1.18; 715/847
See application file for complete search history.

(56) References Cited

U.S. PATENT DOCUMENTS 6,567,627 B2 5/2003 Maeda et al.
6,744,424 B2 6/2004 Maeda et al.
6,795,663 B2 9/2004 Kato
6,978,095 B2 12/2005 Kato
7,512,354 B2 3/2009 Hoshino et al.
7,539,433 B2 5/2009 Hoshino et al.
7,546,055 B2 6/2009 Hoshino et al.
7,747,185 B2 6/2010 Kimoto et al.
2007/0211262 A1 9/2007 Kimoto et al.
2007/0211263 A1 9/2007 Hoshino et al.
2007/0211264 A1 9/2007 Hoshino et al.

FOREIGN PATENT DOCUMENTS

JP 2004185464 A 7/2004

OTHER PUBLICATIONS

Hoshino, Naoki, Pending U.S. Appl. No. 11/373,645, filed Mar. 9, 2006.
Hoshino, Naoki, Pending U.S. Appl. No. 11/373,403, filed Mar. 9, 2006.
Hoshino, Naoki, Pending U.S. Appl. No. 11/373,011, filed Mar. 9, 2006.
Kimoto, Yuko Pending U.S. Appl. No. 11/373,799, filed Mar. 9, 2006.
Hoshino, Naoki Pending U.S. Appl. No. 11/373,013, filed Mar. 9, 2006.
Hoshino, Naoki, Pending U.S. Appl. No. 11/373,395, filed Mar. 9, 2006.
Kimoto Yuko, Pending U.S. Appl. No. 11/373,012, filed Mar. 9, 2006.

*Primary Examiner* — Robert Beatty
(74) *Attorney, Agent, or Firm* — SoCal IP Law Group LLC; Steven C. Sereboff; John E. Gunther

(57) ABSTRACT

In a display unit, a setting check key for checking present set contents is displayed together with a setting screen such as a basic screen for performing various basic settings. In a case where a user indicates a setting check key displayed in the setting screen, the display unit displays a template registration key for registering the present set contents as a template together with a setting check screen displaying the present set contents. In a case where the template registration key is indicated, processing is executed to register the present set contents as the template.

32 Claims, 12 Drawing Sheets

MULTIFUNCTION PERIPHERAL WITH TEMPLATE REGISTRATION AND TEMPLATE REGISTRATION METHOD

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an operation device for a user to designate various types of processing such as photocopy, facsimile, scanning, and image filing, and multifunction peripherals which perform various types of processing based on user's designated set contents.

2. Description of the Related Art

Heretofore, in multifunction peripherals having a plurality of functions such as a photocopy function, a facsimile function, a scanner function, a printer function, and an image filing function, there is disposed an operation panel for a user to perform various settings. However, in the conventional operation panel, an operation to perform various types of settings is complicated or is not easy to understand in some case. For example, the multifunction peripherals have a function (template function) of registering specific set contents beforehand as a template, and calling set contents stored as the template in response to user's instruction.

The conventional multifunction peripherals are provided with one template key for shifting to the template function in many cases. In such multifunction peripherals, the template function can be performed in a case where the template key is indicated by the user. That is, in the conventional multifunction peripherals, after indicating the template key, there has to be selectively performed an operation to register the present set contents as the template or an operation to call the set contents registered as the template in many cases.

However, the multifunction peripherals have a problem that it is not easy to see operability after shifting to the template function or an operation timing to shift to the template function. Especially, it is not easy to see an operation timing for shifting to a mode allowing the user who performs various settings to register the set contents as the template in a case where the set contents are registered as the template. In this case, there is another problem that an operation is complicated which checks the present set contents before they are registered as the template. Owing to the above-described problems, in actual, the template function is not effectively utilized in the conventional multifunction peripherals, and any efficient operation is not performed in many cases.

BRIEF SUMMARY OF THE INVENTION

An object of the present invention is to provide an operation device and multifunction peripherals which can efficiently perform various processing and whose operability is satisfactory.

In an aspect of the present invention, an operation device is for use in a device which operates based on set contents, and has: a display unit which displays various setting screens; an operation unit which inputs setting information; a storage unit which stores information indicating the set contents as a template; a display control unit which displays, in the display unit, a template registration key to register the set contents as the template together with a setting check screen displaying the set contents input by the operation unit; and a template registration unit which registers the set contents displayed in the setting check screen as the template in the storage unit in a case where the display control unit indicates the template registration key in the setting check screen displayed in the display unit.

In another aspect of the present invention, multifunction peripherals perform photocopy processing based on set contents, and has: a display unit which displays various setting screens; an operation unit which inputs setting information; a processing unit which performs the photocopy processing based on the set contents input by the operation unit; a storage unit which stores information indicating the set contents as a template; a display control unit which displays, in the display unit, a template registration key to register the set contents as the template together with a setting check screen displaying the set contents input by the operation unit; and a template registration unit which registers the set contents displayed in the setting check screen as the template in the storage unit in a case where the display control unit indicates the template registration key in the setting check screen displayed in the display unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

There will be described hereinafter a preferable embodiment for carrying out the present invention with reference to the drawings.

Figure 1:
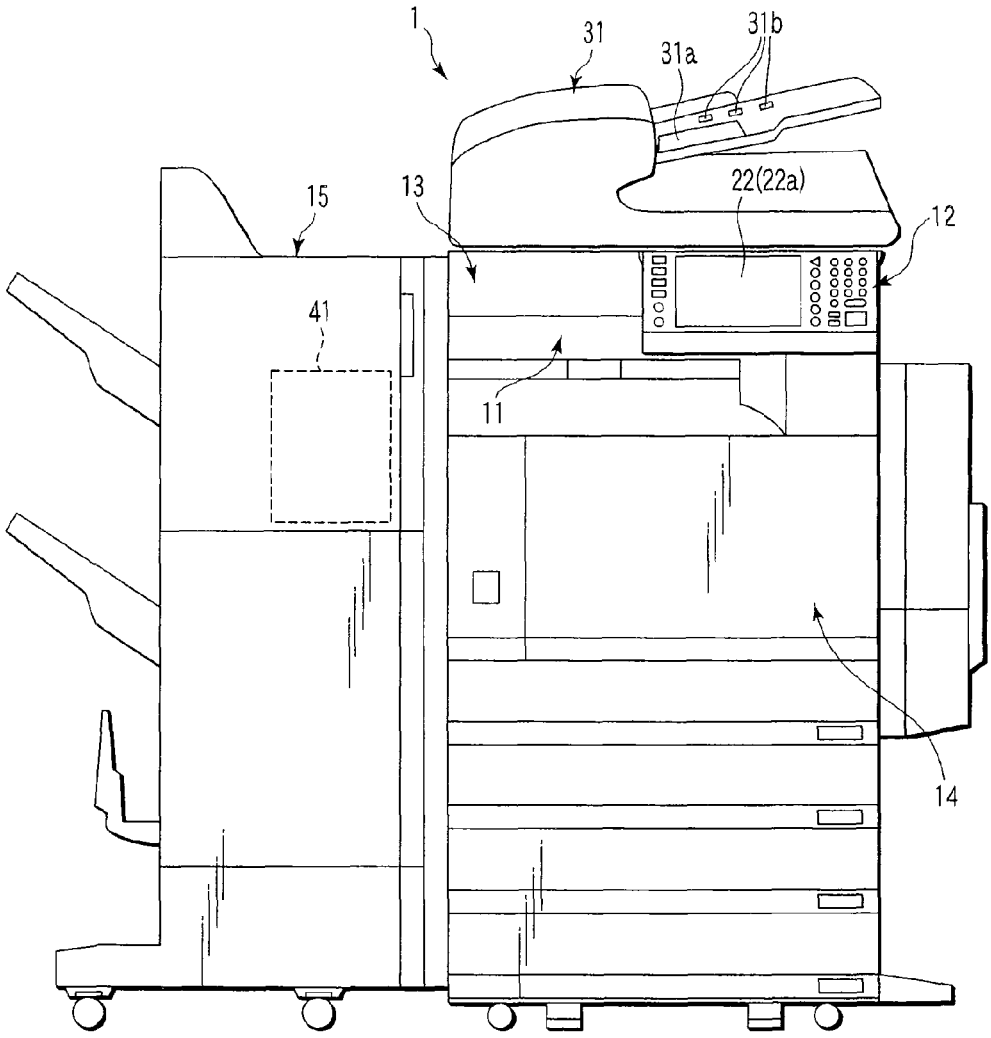
FIG. 1 is a diagram showing an appearance constitution of a digital multifunction peripherals 1 as an image forming apparatus in an embodiment of the present invention.

FIG. 1 is a diagram showing an appearance constitution of a digital multifunction peripherals 1 as an image forming apparatus in the embodiment of the present invention.

As shown in FIG. 1, this digital multifunction peripherals 1 is constituted of a system control unit 11, an operation panel 12, a scanner unit 13, a printer unit 14, a finisher unit 15 and the like.

The system control unit 11 controls the whole digital multifunction peripherals 1. The system control unit 11 is disposed in a main body of the digital multifunction peripherals 1. The system control unit 11 is connected to the operation panel 12, the scanner unit 13, the printer unit 14, the finisher unit 15 and the like. Accordingly, the system control unit 11 performs various controls with respect to the respective units.

The operation panel 12 is disposed on a front surface of the digital multifunction peripherals main body. The operation panel 12 is a user interface. An operation surface of the operation panel 12 is provided with hardware keys 21 as an operating section, a display section 22 in which a touch panel 22a is built and the like.

The scanner unit 13 functions as an image reading unit which reads an image of a draft. The scanner unit 13 is disposed in an upper part of the digital multifunction peripherals main body. The scanner unit 13 main body is constituted of: a scanning section (not shown) which optically scans a draft surface; a photoelectric converting section (not shown) such as a CCD line sensor which converts, into an electric signal, light reflected by the draft surface optically scanned by the scanning section and the like.

Moreover, the scanner unit 13 has an auto document feeder (ADF) 31. The ADF 31 conveys the surface of the draft to be read to an image reading position of the scanner unit 13 main body. That is, the image of the draft conveyed by the ADF 31 is read by the scanner unit 13 main body. The ADF 31 has: a draft table on which the draft is to be set; a conveying mechanism which conveys the drafts set on the draft table one by one; and a draft discharge section to which the draft conveyed by the conveying mechanism is discharged. The draft table of the ADF 31 is provided with a guide section 31a which guides the conveyed drafts and a plurality of sensors 31b for detecting a size of the draft. The guide section 31a and each sensor 31b function as a detector for detecting the size of the draft on the draft table.

The printer unit 14 forms an image on a sheet (photocopy sheet) as an image forming medium. The printer unit 14 is constituted of, for example, a conveying section which conveys the sheet, an image forming section which forms an image on the sheet conveyed by the conveying section and the like.

The finisher unit 15 performs various types of finish processing with respect to the sheet as the image forming medium printed by the printer unit 14. The finisher unit 15 has finishing functions such as: a stapling function of stapling together a plurality of sheets printed by the printer unit 14; a sorting function of sorting the sheets printed by the printer unit 14 based on a set sorting method; and a stacking function of discharging the sheet printed by the printer unit 14 based on a set sheet discharging order or a set sheet discharging method. The finisher unit 15 has finishing functions realized by a control similar to that of the stapling function, such as: a hole punching function of making a hole in a predetermined position in the sheet printed by the printer unit 14; and a saddle stitching function of folding back a plurality of sheets printed by the printer unit 14 along the center line of each sheet to staple together the sheets.

The finisher unit 15 has a stapler 41 or the like as a mechanism for performing the stapling function. For example, the stapler 41 staples together the plurality of sheets sorted by the sorting function. The stapler 41 has a function of stapling together the sheets by multi-positions thereof. Therefore, the stapling function staples together the positions to be stapled, selected by the user, with respect to the plurality of sheets sorted by the sorting function.

Figure 2:
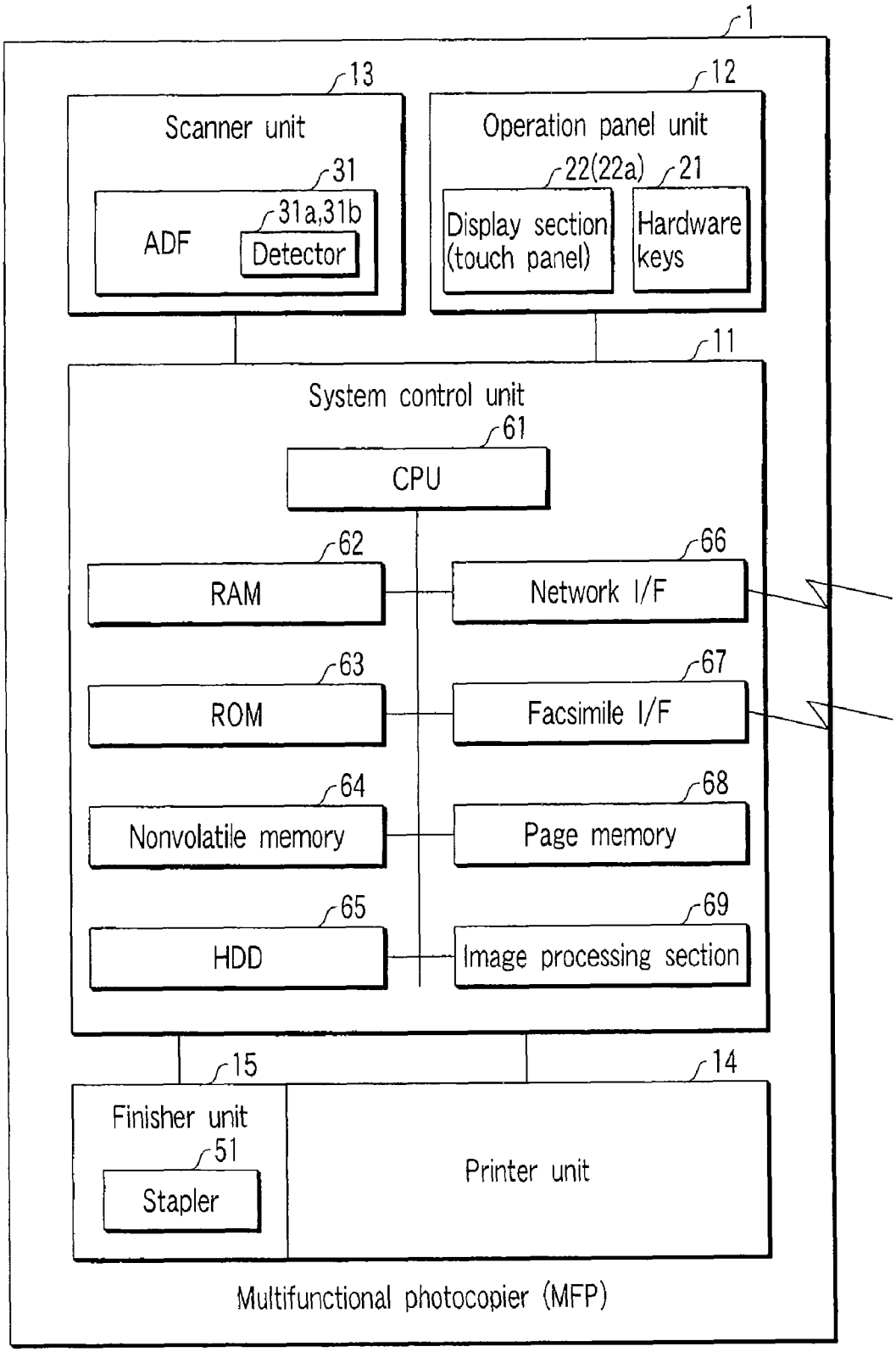
FIG. 2 is a block diagram showing a constitution of a control system of the digital multifunction peripherals 1 as the image forming apparatus in an embodiment of the present invention.

FIG. 2 is a block diagram showing a constitution of a control system of the digital multifunction peripherals 1 as an image forming apparatus in the embodiment of the present invention.

As shown in FIG. 2, in this digital multifunction peripherals 1, the system control unit 11 is connected to the operation panel 12, the scanner unit 13, the printer unit 14, and the finisher unit 15.

The system control unit 11 controls the operation panel 12, the scanner unit 13, the printer unit 14, the finisher unit 15 and the like. The system control unit 11 has various functions of performing various types of processing based on signals supplied from the operation panel 12, the scanner unit 13, the printer unit 14 and the finisher unit 15.

The operation panel 12 has the hardware keys 21, the display section 22 in which the touch panel 22a is built and the like. In the display section 22, there are displayed an operation guidance, keys (icons) selectable by the touch panel 22a and the like under a display control of the system control unit 11. In the operation panel 12, the user operates the hardware keys 21, or inputs the icon selectable by the touch panel 22a. The operation panel 12 supplies, to the system control unit 11, information input by the user (the information indicating the hardware key 21 pressed by the user or the icon selectable by the touch panel 22a touched by the user).

The scanner unit 13 converts the image of the draft into image data under the control of the system control unit 11. The scanner unit 13 converts the draft image into color or monochromatic digital image data. The scanner unit 13 supplies the digital image data as the read draft image to the system control unit 11.

Moreover, the scanner unit 13 has the ADF 31 provided with the detectors 31a, 31b. Detection signals of the detectors 31a, 31b of the ADF 31 are supplied to the system control unit 11. The system control unit 11 realizes an ADF draft size detecting function of detecting a size of the draft set in the ADF 31 based on the detection signals of the detectors 31a, 31b.

The printer unit 14 prints the image on the sheet as the image forming medium under the control of the system control unit 11. A result of the print processing performed by the printer unit 14 and the like are notified to the system control unit 11. The printer unit 14 performs color printing to form a color image on the image forming medium based on the color image data, or monochromatic printing to form a monochromatic image on the image forming medium based on the monochromatic image data. The printer unit 14 is constituted of: for example, the conveying section (not shown) which conveys the image forming medium; the image forming section (not shown) which forms the color image or the monochromatic image on the image forming medium conveyed by the conveying section and the like.

The finisher unit 15 performs various types of processing with respect to the sheet as the image forming medium printed by the printer unit 14 under the control of the system control unit 11. The processing result and the like of the finisher unit 15 are notified to the system control unit 11. The finisher unit 15 executes a finishing function such as the stapling function, the sorting function, or the stacking function based on the control by the system control unit 11.

Moreover, as shown in FIG. 1, the system control unit 11 is constituted of: a central processing unit (CPU) 51; a random access memory (RAM) 52; a read only memory (ROM) 53; a nonvolatile memory 54; a hard disk drive (HDD) 55; a network interface (I/F) 56; a facsimile interface (I/F) 57; a page memory 58; an image processing section 59 and the like.

The CPU 51 controls the whole system control unit 11. The CPU 51 executes a program stored in the ROM 53, the nonvolatile memory 54 or the HDD 55 to thereby perform various types of processing. For example, the CPU 51 executes the control program to thereby realize the ADF draft size detecting function. A display control of the display section 22 of the operation panel 12 is executed by the CPU 51 based on the program and control data stored in the ROM 53, the nonvolatile memory 54, or the HDD 55.

The RAM 52 is a memory which temporarily stores data for working or which stores data to be referred to. The RAM 52 is used as a main memory for executing various types of processing based on various control programs. For example, in the RAM 52, during an operation of the digital multifunction peripherals, control program or control data is loaded, and information to be temporarily held and the like are stored such as information indicating the present set contents.

Moreover, examples of the set contents in a photocopy mode include a photocopy magnification, the number of sheets to be photocopied, and a finishing mode (staple setting, etc.) in addition to a draft setting and a sheet setting. The draft setting includes a size of a draft, a draft setting direction, a direction of the image in the draft, the surface of the draft to be read (a draft reading mode is a single-sided or double-sided mode) and the like. The sheet setting includes a size of the sheet, a direction of the sheet, a direction of the image in the sheet, the surface of the sheet to be printed (a sheet printing mode is a single-sided or double-sided mode) and the like.

The ROM 53 is a nonvolatile memory. In the ROM 53, there are stored, for example, a control program, control data and the like for controlling the digital multifunction peripherals 1. In the ROM 53, there may be stored display data and the like to be displayed in the display section 22 of the operation panel 12.

The nonvolatile memory 54 is a rewritable nonvolatile memory. In the nonvolatile memory 54, there is stored data such as system setting information. The nonvolatile memory 54 may store display data and the like to be displayed in the display section 22 of the operation panel 12.

The HDD 55 is a large-capacity storage device. In the HDD 55, there are stored various data such as various setting data, management data, control program and control data. In the HDD 55, there are also stored display data and the like to be displayed in the display section 22 of the operation panel 12. In the HDD 55, there are also stored image data and the like read by the scanner unit 13. Furthermore, the HDD 55 may be used as a backup memory for various memories.

The network interface 56 performs data communication via the network. The network interface 56 is constituted of, for example, a network interface card (NIC) and the like. The digital multifunction peripherals 1 realizes a network printing function of printing, on the sheet, print data from an external device connected to the network interface 56 via the network.

The facsimile interface 57 transmits and receives facsimile data. In the digital multifunction peripherals 1, a facsimile function is realized using the facsimile interface 57. For example, facsimile reception processing is realized by monochromatically printing, by the printer unit 14, the facsimile data received by the facsimile interface 57. Moreover, the facsimile interface 57 realizes facsimile transmission processing by transferring, to a destination, the facsimile data converted from the image data of the draft read by the scanner unit 13.

The page memory 58 is a memory in which the image data to be printed by the printer unit 14 and the like are stored. The page memory 58 is controlled by a page memory controller (not shown). For example, in a case where the printer unit 14 performs the print processing, in the page memory 58 there is developed (stored) the color image data or the monochromatic image data of each page to be printed by the printer unit 14.

The image processing section 59 subjects the image data to various types of image processing. The image processing section 59 is constituted of an image processing circuit and the like. The image processing section 59 performs image processing such as correction, compression, or extension of the image data.

Next, there will be described a constitution of the operation panel 12.

Figure 3:
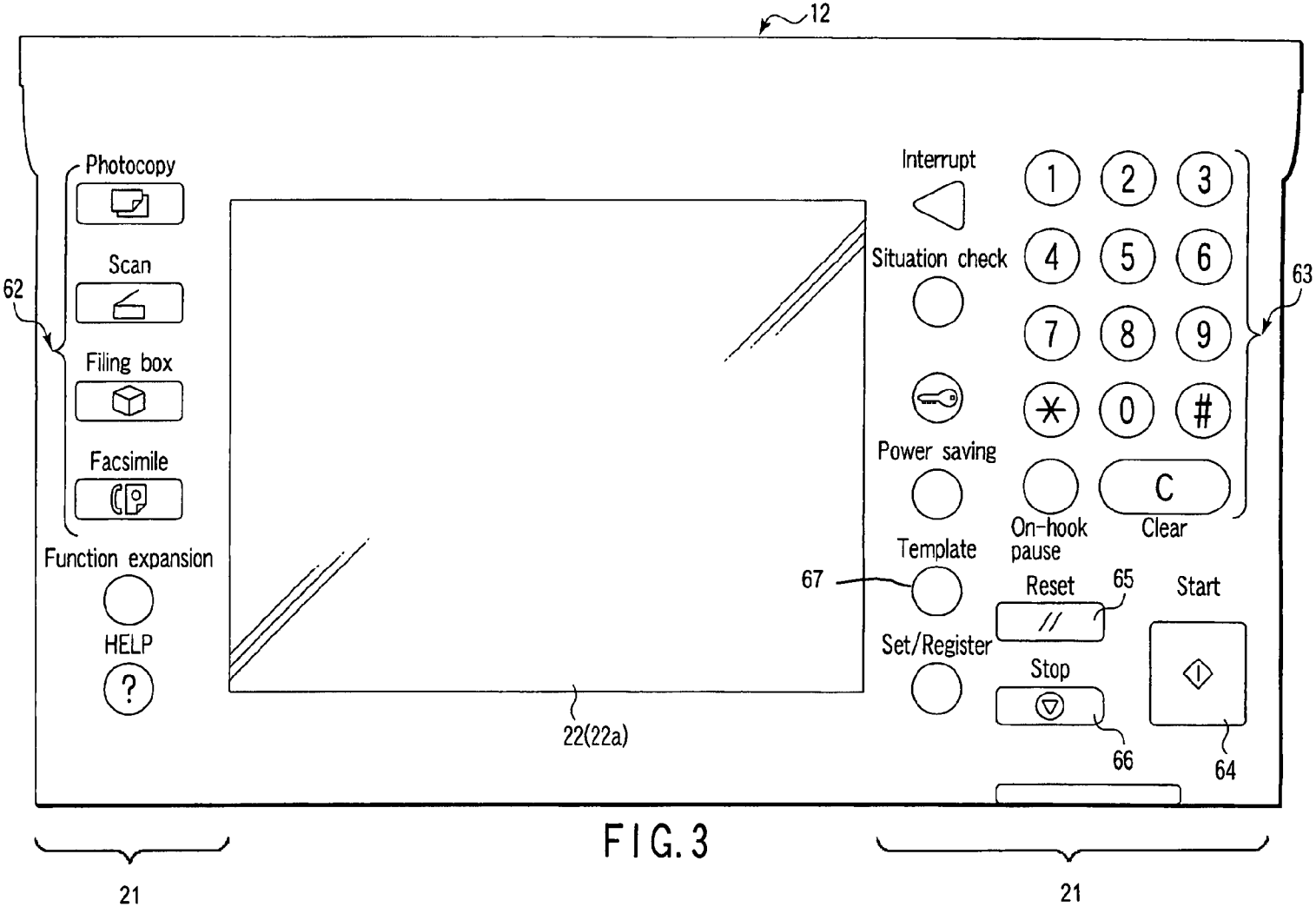
FIG. 3 is an appearance diagram showing a constitution example of an operation panel.

FIG. 3 is an appearance diagram showing a constitution example of the operation panel 12.

As shown in FIG. 3, the operation panel 12 is provided with various hardware keys 21, the display section 22 in which the touch panel 22a is built and the like. Examples of the hardware keys 21 include function selecting keys 62, ten keys 63, a start key 64, a reset key 65, a stop key 66, and a template call key 67.

The function selecting keys 62 are hardware keys for selecting various functions. Examples of the function selecting keys 62 include a scanning function selecting key for selecting a scanning function, a photocopy function selecting key for selecting a photocopy function, a FAX function selecting key for selecting a facsimile function, a filing box key for selecting a data filing function, and a function expansion key for selecting another expanded function.

The ten keys 63 are hardware keys for inputting numerals and the like. The ten keys 63 are used in inputting information such as the number of sheets to be photocopied, a photocopy magnification, and a password (personal identification number) for management.

The start key 64 is a hardware key for instructing start of an operation. For example, in the photocopy function, a photocopy operation is started in response to the instruction of the start key 64.

The reset key 65 is a hardware key for instructing reset of the set contents and the like. For example, when the reset key 65 is input, the set contents and the like designated by the user are reset, and changed into a default setting value.

The stop key 66 is a hardware key for instructing discontinuation of the operation being executed by the digital multifunction peripherals. For example, when the stop key 66 is indicated during the photocopy operation of the digital multifunction peripherals, the photocopy operation is stopped.

The template call key 67 is a hardware key for calling, as a template, data such as setting information registered beforehand. For example, when the template call key 67 is input, the display section 22 displays a template selection screen for selecting, as the template, data such as the registered setting information. The template function will be described later in detail.

Moreover, in addition to the above-described various keys, the operation panel 12 shown in FIG. 3 includes, as the hardware keys 21: a help (HELP) key to instruct display of a user guidance; an interrupt key to demand an interrupt of an operation; a situation check key to check a state of the digital multifunction peripherals; a key to perform security setting or the like; a power saving key for switching a power saving operation mode to reduce power consumption and a usual operation mode; an on-hook/pause key to bring a phone function into an on-hook state; a clear key to clear numerals and the like input by the ten keys and the like. Furthermore, the operation panel 12 shown in FIG. 3 also includes an alarm display to notify an abnormality of the digital multifunction peripherals and the like.

The display section 22 is constituted of a liquid crystal display in which the touch panel 22a is built. In the display section 22, various operation screens are displayed. Each operation screen displayed in the display section 22 displays a key (icon) selectable by the touch panel 22a in addition to the operation guidance. An example of a screen displayed in the display section 22 will be described later in detail.

The display contents displayed in the display section 22 are controlled by, for example, the system control unit 11. The display data to be displayed in the display section 22 is stored in a storage device such as the HDD 55, the nonvolatile memory 54 or the ROM 53 of the system control unit 11. That is, the storage device (the HDD 55, the nonvolatile memory 54, or the ROM 53) of the system control unit 11 stores data such as various screens, guidance, icons or graphical images to be displayed in the display section 22.

The CPU 51 of the system control unit 11 judges user's operation contents or display contents in accordance with an operation situation of each component. Based on this judgment, the CPU 51 executes a control in reading the display data to be displayed in the display section 22 from the HDD 55, the nonvolatile memory 54 or the ROM 53 to display the data in the display section 22. That is, the CPU 51 controls the display of the display section 22 in accordance with the user's operation contents or the operation situation of each component.

Next, there will be described a basic screen and a setting check screen in a photocopy mode.

The basic screen in the photocopy mode is a setting screen which is a base for the user to perform various settings. The basic screen displays the operation guidance, the present set contents, and further a key (icon) for setting basic setting particulars.

Moreover, the setting check screen is a screen for the user to check the present set contents. In the setting check screen, the present set contents are displayed in detail. The setting check screen is a screen to be displayed in the display section 22, in a case where a setting check key (described later) is input in the basic screen.

FIGS. 4 to 7 are diagrams showing display examples of a basic screen 70 (70a, 70b, 70c, and 70d) and a setting check screen 100 (100a, 100b, 100c, and 100d) in the photocopy mode.

Figure 4:
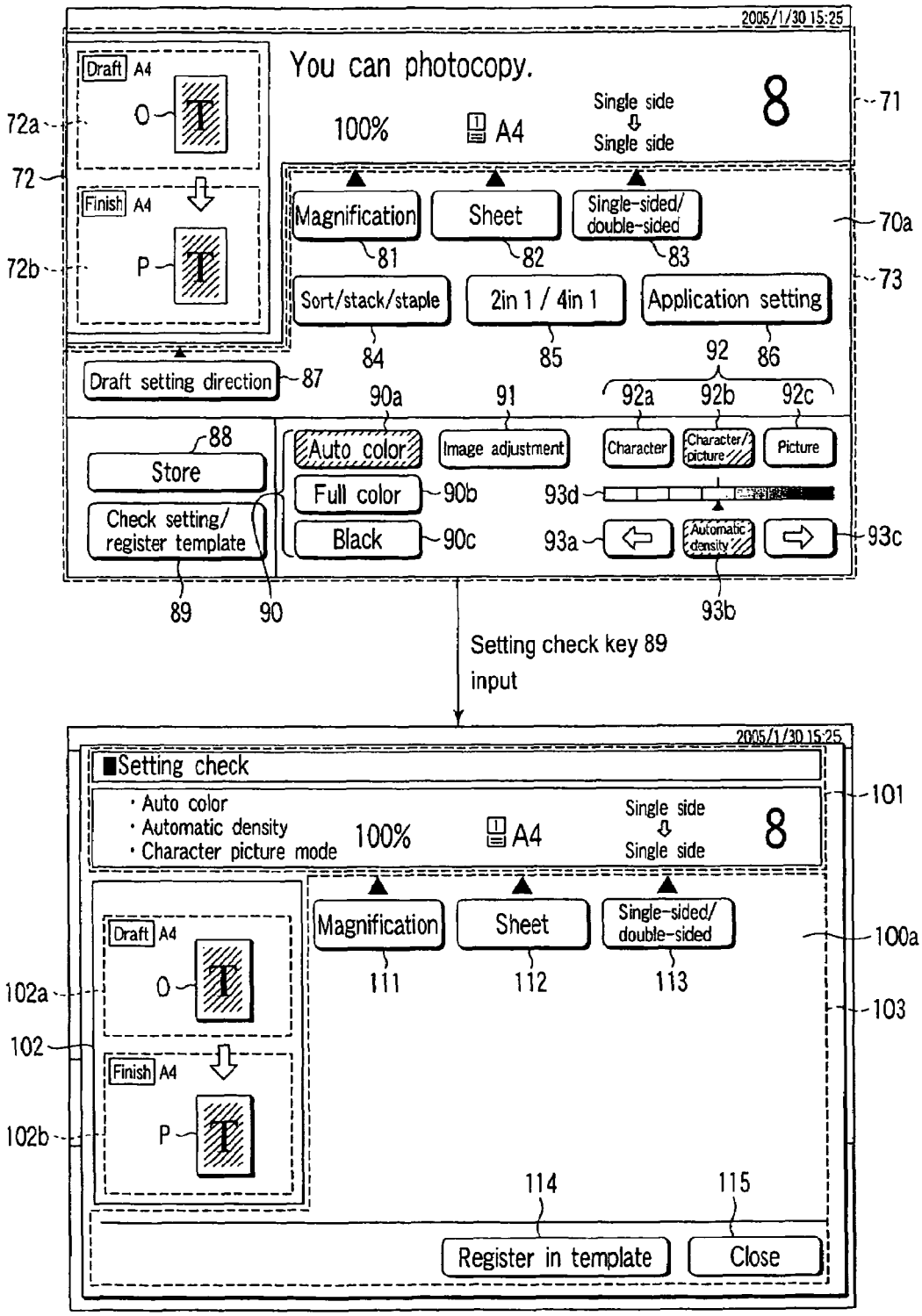
FIG. 4 is a diagram showing a display example of a photocopy mode basic screen and a setting check screen.
Figure 5:
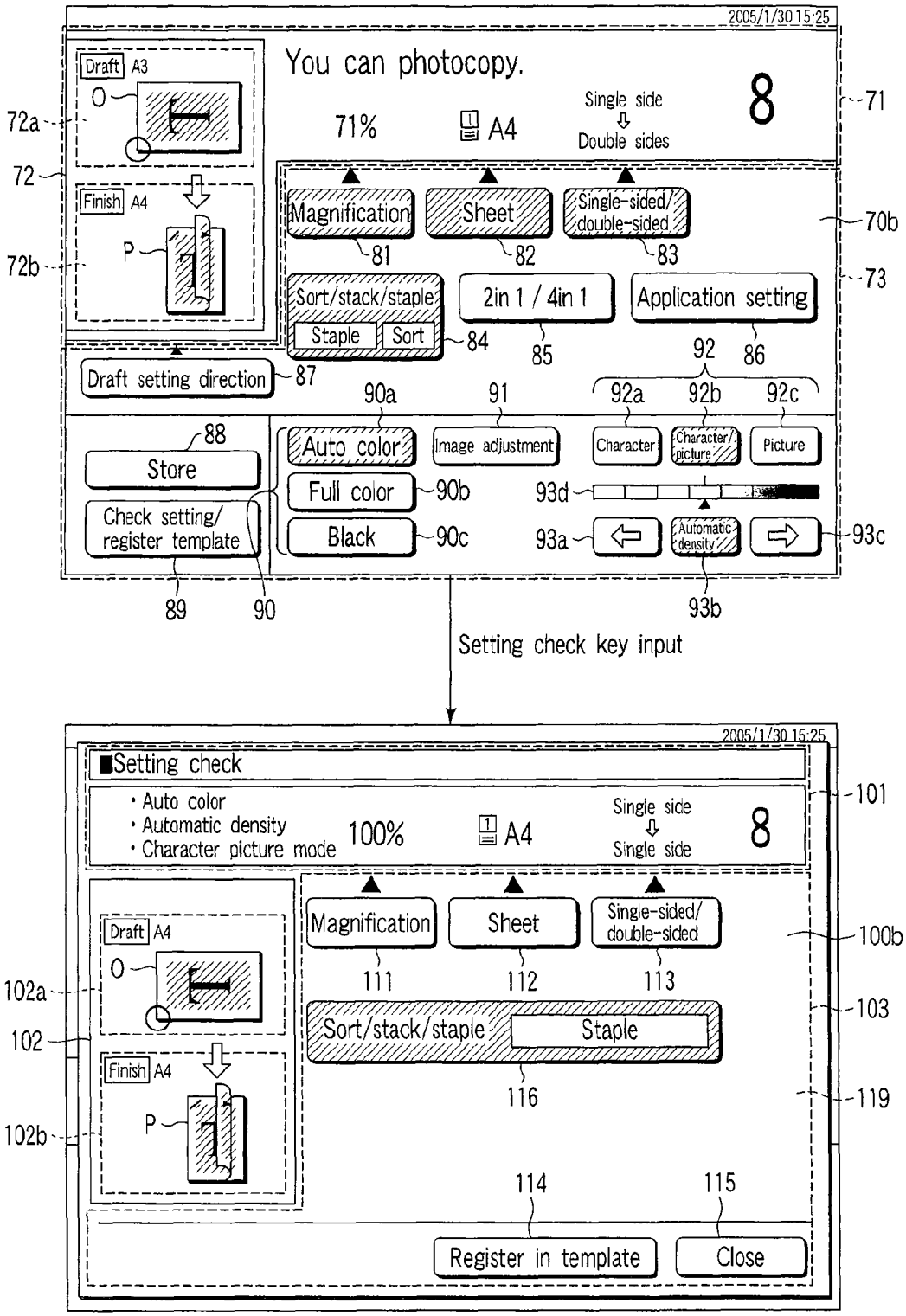
FIG. 5 is a diagram showing a display example of a basic screen and a setting check screen in a case where stapling is set.
Figure 6:
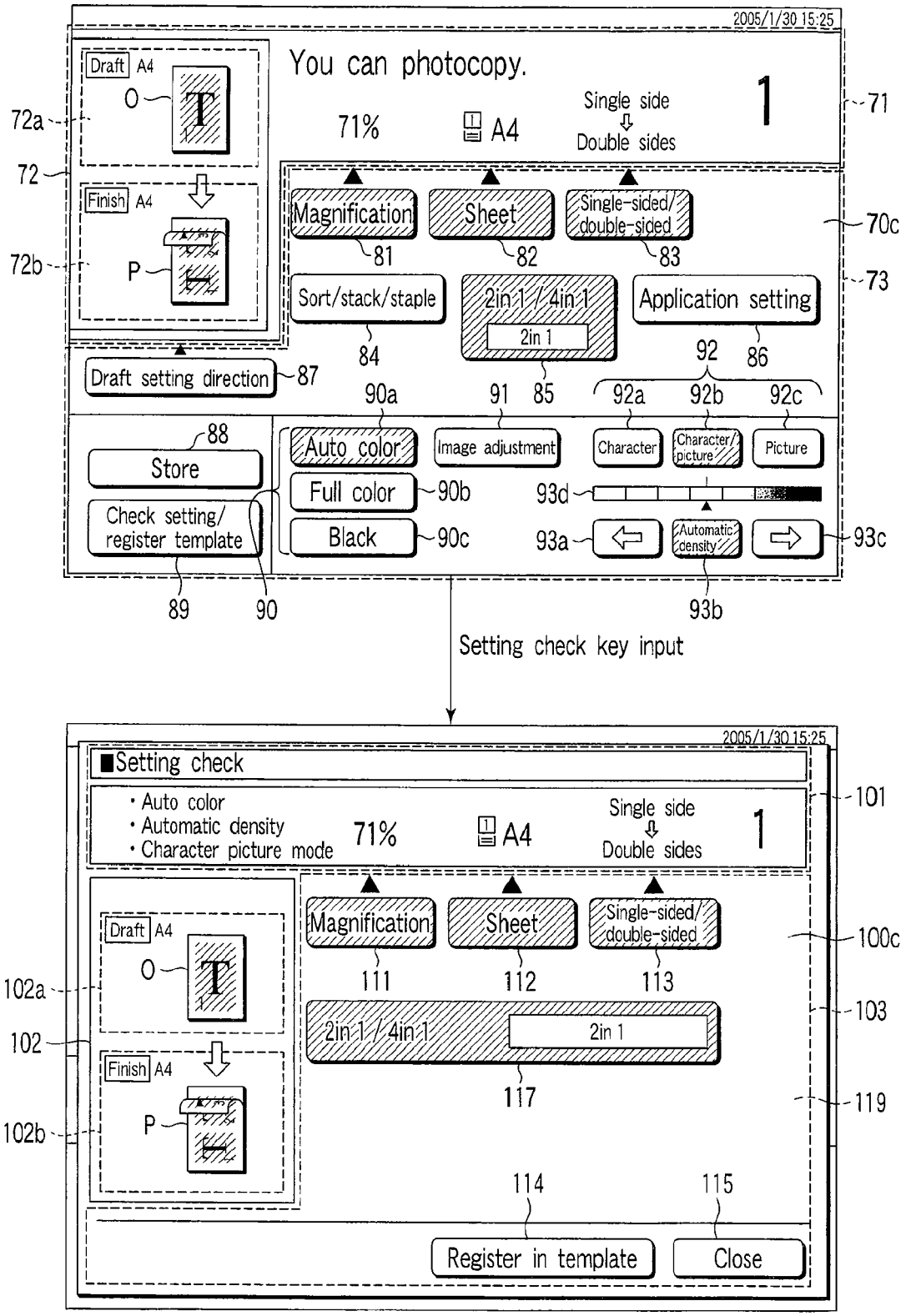
FIG. 6 is a diagram showing a display example of a basic screen and a setting check screen in a case where 2in1 is set.
Figure 7:
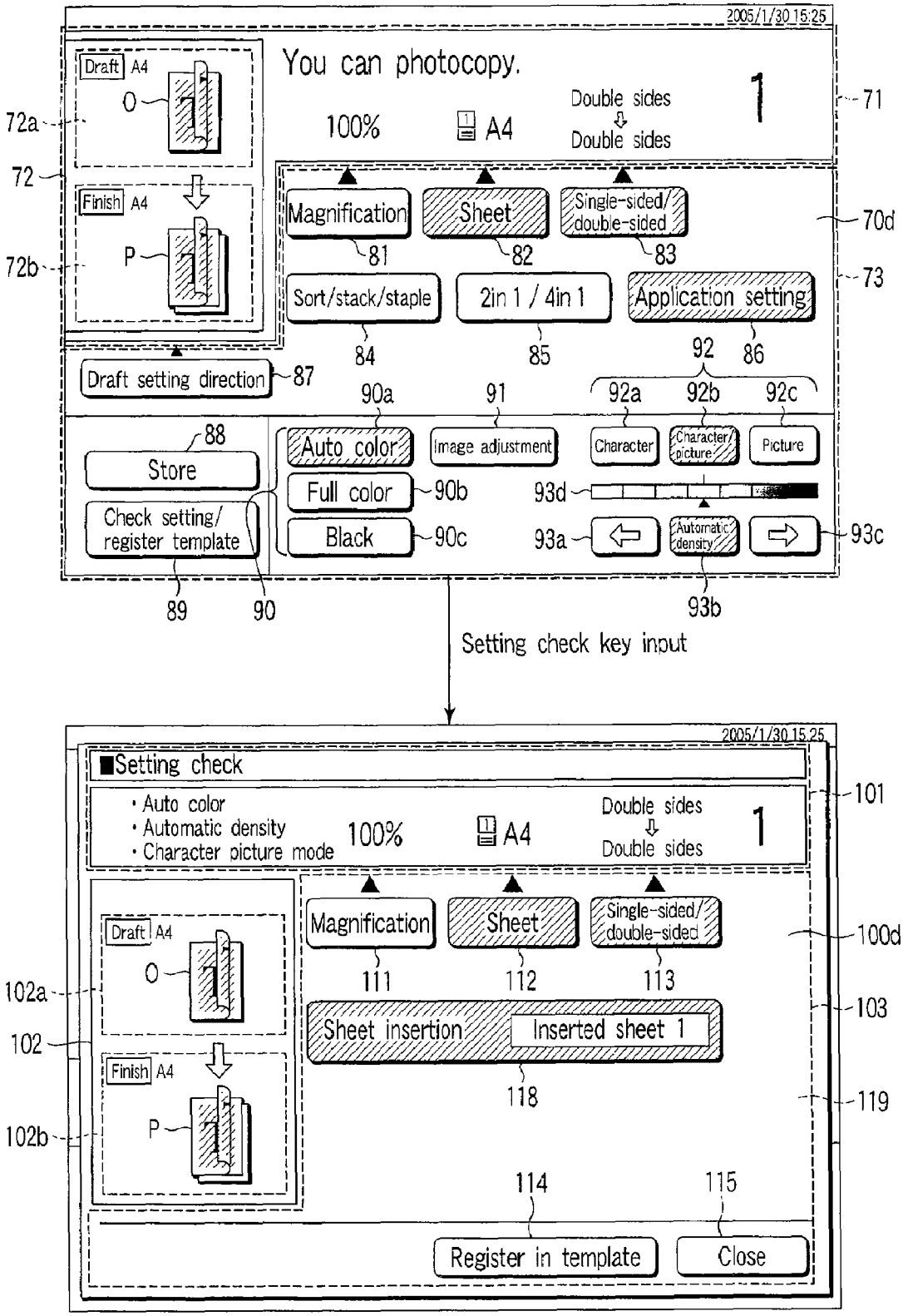
FIG. 7 is a diagram showing a display example of a basic screen and a setting check screen in a case where sheet insertion is set.

FIG. 4 shows a display example of a basic screen 70a and a setting check screen 100a in a case where finishing setting, Nin1 (a function of printing, onto one sheet, a plurality of draft images (N original images)) setting, and application setting are not performed. FIG. 5 shows a display example of a basic screen 70b and a setting check screen 100b in a case where stapling is set as the finishing setting, and the Nin1 setting and the application setting are not performed. FIG. 6 shows a display example of a basic screen 70c and a setting check screen 100c in a case where 2in1 is set as the Nin1 setting, and the finishing setting and the application setting are not performed. FIG. 7 shows a display example of a basic screen 70d and a setting check screen 100d in a case where an inserted sheet is set as the application setting, and the finishing setting and the Nin1 setting are not performed.

First, the basic screen 70 will be described.

As shown in FIGS. 4 to 7, the basic screen 70 (70a, 70b, 70c, or 70d) in the photocopy mode is constituted of display areas such as: a guidance display area 71; a display area 72 of draft setting and sheet setting; and a display area 73 of function setting buttons.

The display area 71 is disposed in an upper part of the screen. The display area 72 is disposed in a left part of the screen. The display area 73 ranges from the center to a right part of the screen.

The display area 71 displays a message, a magnification, a sheet size, a photocopy side (single-sided/double-sided), the number of sheets to be photocopied and the like. As the message, the present state of the digital multifunction peripherals and the like are displayed. As the magnification, the presently set photocopy magnification is displayed. As the sheet size, the presently set sheet size is displayed. As the photocopy side, the presently set mode is displayed among: a mode (single-sided/single-sided mode) to photocopy a single side of the draft onto a single side of the sheet; a mode (single-sided/double-sided mode) to photocopy a single side of the draft onto double sides of the sheet; a mode (double-sided/single-sided mode) to photocopy double sides of the draft onto the single side of the sheet; and a mode (double-sided/double-sided mode) to photocopy double sides of the draft onto the double sides of the sheet. As the number of the sheets to be photocopied, the presently set photocopy number is displayed.

The display area 72 is constituted of a first display area 72a and a second display area 72b.

In the first display area 72a, there is displayed information indicating the presently set draft. For example, in the first display area 72a, a draft graphical image Og is displayed which indicates the present draft setting together with character information indicating the draft size. The draft graphical image Og shows the draft size, the draft direction (disposing direction), the direction of the image in the draft (portrait or landscape), the surface of the draft to be read (single-sided or double-sided) and the like. Accordingly, the user can visually and intuitively image the present draft setting.

The second display area 72b displays information indicating finish (printed sheet) in a case where the sheet is printed with the present set contents. The second display area 72b displays a graphical image Pg of the finish together with the character information indicating a finish size (photocopy sheet size). The finished graphical image Pg displayed in the second display area 72b shows the size of the sheet (photocopy sheet) on which the draft image is to be printed, the direction of the sheet, the direction of the image (portrait or landscape) to be printed on the sheet, the surface of the sheet to be printed (single-sided/double-sided) and the like. Accordingly, the user can visually and intuitively image the present sheet setting.

Moreover, as shown in FIG. 4, the first display area 72a is adjacent to the second display area 72b. Furthermore, the draft graphical image Og displayed in the first display area 72a is associated with the finished graphical image Pg displayed in the second display area 72b by a mark such as an arrow. Therefore, the user can visually and intuitively associate the set contents of the draft with those of the sheet (finish) to check them.

In the display area 73, there are displayed keys for setting various functions selectable by the touch panel 22a. The various setting keys displayed in the display area 73 are keys for performing various settings. The various setting keys displayed in the display area 73 are characters indicating the set contents and the like, and icons in which patterns, graphics or the like are displayed.

The display area 73 displays: a magnification key 81; a sheet key 82; a photocopy side (single-sided/double-sided) key 83; a finishing (sort/stack/staple) setting key 84; an Nin1 (2in1/4in1) key 85; an application setting key 86; a draft setting (draft setting direction) key 87; a store key 88; a setting check key 89; a color mode setting portion (an auto color key 90a, a full color key 90b, and a black key 90c) 90, an image adjustment key 91; a draft mode setting portion (a character key 92a, a character picture key 92b, and a picture key 92c) 92; a density adjustment portion (a density down key 93a, a density up key 93b, an automatic density key 93c, and a density display portion 93d) 93 and the like.

The magnification key 81 is constituted of an icon in which a "magnification" is displayed. The magnification key 81 is a key to be touched by the user in setting the magnification (photocopy magnification) of the image to be printed on the sheet with respect to the image on the draft. When the magnification key 81 is touched, the CPU 51 displays a magnification setting screen for setting the photocopy magnification in the display section 22. In this case, the CPU 51 performs set processing to set the photocopy magnification in response to the key input by the user in a state in which the magnification setting screen is displayed.

The sheet key 82 is constituted of an icon in which a "sheet" is displayed. The sheet key 82 is a key to be touched by the user in setting the sheet size or the draft size. In a case where the sheet key 82 is touched, the CPU 51 displays, in the display section 22, a sheet setting screen for setting the photocopy sheet size or the draft size. In this case, the CPU 51 performs the sheet set processing in response to the key input in a state in which the sheet setting screen is displayed.

The draft setting key 87 is constituted of an icon in which the "draft setting direction" is displayed. The draft setting key 87 is a key to be touched by the user in setting a direction in which the draft is to be set. It is to be noted that when the ADF draft size detecting function is invalid, the draft setting key 87 sets the draft size and the draft setting direction. In a case where the draft setting key 87 is touched, the CPU 51 of the system control unit 11 displays, in the display section 22, a draft direction setting screen for setting the draft setting direction. In this case, the CPU 51 performs the draft set processing in accordance with the key input in a state in which the draft direction setting screen is displayed.

It is to be noted that in a case where the ADF draft size detecting function is invalid, the draft setting key 87 is constituted of an icon in which the "draft size/setting direction" is displayed. In this case, when the draft setting key 87 is touched, the CPU 51 of the system control unit 11 displays, in the display section 22, the draft setting screen for setting the draft size and the draft setting direction in the ADF. In this case, the CPU 51 performs the draft set processing in response to the input key in a state in which the draft setting screen is displayed.

The photocopy side key 83 is constituted of an icon in which "single-sided/double-sided" is displayed. The photocopy side key 83 is a key to be touched by the user in setting the photocopy side. In a case where the photocopy side key 83 is touched, the CPU 51 displays, in the display section 22, a setting screen for setting the single-sided/single-sided mode, the single-sided/double-sided mode, the double-sided/single-sided mode, or the double-sided/double-sided mode as a photocopy side mode. In this case, the CPU 51 performs the photocopy side set processing in response to the key input in a state in which the photocopy side setting screen is displayed.

Moreover, the magnification key 81, the sheet key 82, and the photocopy side key 83 are disposed in the vicinity of the guidance display area 71. The magnification key 81, the sheet key 82, and the photocopy side key 83 are associated with the magnification, the sheet, and the photocopy side displayed in the guidance display area 71. The magnification setting, the sheet setting, and the photocopy side setting are basic set particulars for frequent use in the photocopy mode. Therefore, the magnification key 81, the sheet key 82, and the photocopy side key 83 are disposed in the vicinity of the guidance display area 71 so that the user easily touches the keys, and easily checks the set contents.

The finishing (sort/stack/staple) setting key 84 is constituted of an icon in which "sort/stack/staple" is displayed. The finishing (sort/stack/staple) setting key 84 is a key to be touched by the user in setting contents of finishing processing performed by the finisher unit 15.

In a case where the finishing setting key 84 is touched, the CPU 51 displays, in the display section 22, a setting screen (finishing setting screen) for setting the finishing (sort/stack/staple). In this case, the CPU 51 performs the finishing set processing in response to the key input in a state in which the finishing setting screen is displayed.

Moreover, the finishing setting key 84 is changed to an icon in which set contents are displayed in a case where the finishing function is set. For example, in a case where the stapling is set as one of finishing functions, the finishing setting key 84 in the basic screen 70 is changed to an icon "staple" is displayed together with "sort/stack/staple" as shown in the basic screen 70b of FIG. 5.

The Nin1 (2in1/4in1) key 85 is constituted of an icon in which "2in1/4in1" is displayed. The Nin1 key 85 is a key to be touched in setting photocopy in an Nin mode in which images of N pages (e.g., two or four pages) of the draft are printed onto one sheet.

When the Nin1 key 85 is touched, the CPU 51 of the system control unit 11 displays, in the display section 22, an Nin1 setting screen for setting an Nin1 mode. In this case, the CPU 51 performs the Nin1 set processing in response to the key input in a state in which the Nin1 setting screen is displayed.

Moreover, the Nin1 key 85 is changed to an icon in which set contents are displayed in a case where Nin1 is set. For example, in a case where 2in1 is set as Nin1, the Nin1 key 85 in the basic screen 70 is changed into an icon in which "2in1" is displayed together with "2in1/4in1" as shown in the basic screen 70c of FIG. 6.

The application setting key 86 is constituted of an icon in which "application setting" is displayed. The application setting key 86 is a key to be touched in performing setting (e.g., setting of insertion sheet or the like) other than the setting designated by each key displayed in the display area 73 or the hardware key 21.

When the application setting key 86 is touched, the CPU 51 displays, in the display section 22, a setting screen for setting application. In this case, the CPU 51 performs application set processing in response to the key input in a state in which an application setting screen is displayed.

Moreover, the application setting key 86 is changed to an icon in which set contents are displayed in a case where the application is set. For example, in a case where the application is set, the application setting key 86 in the basic screen 70 is brought into the selected state as shown in the basic screen 70d of FIG. 7. It is to be noted that when the insertion sheet is set as one of application settings, the application setting key 86 may be changed to an icon in which "inserted sheet" or "sheet insertion" is displayed together with "application setting". Alternatively, when the insertion sheet is set as one of the application settings, the application setting key 86 may be changed to an icon in which "inserted sheet" is displayed together with "sheet insertion".

The store key 88 is constituted of an icon in which "store" is displayed. The store key 88 is a key to be touched by the user in storing the present set contents. The setting check key 89 is constituted of an icon in which "check setting/register template" is displayed. The setting check key 89 is a key to be touched in a case where the present set contents are checked, or registered as a template. In a case where the setting check key 89 is touched, the CPU 51 displays, in the display section 22, a setting check screen showing the present set contents.

The color mode setting portion 90 is constituted of keys for designating a color mode. The color mode setting portion 90 is constituted of the auto color key 90a, the full color key 90b, and the black key 90c. The auto color key 90a is constituted of an icon in which "auto color" is displayed. The full color key 90b is constituted of an icon in which "full color" is displayed. The black key 90c is constituted of an icon in which "monochromatic photocopy" is displayed.

The auto color key 90a is a key for judging whether the draft is chromatic or monochromatic, and setting color photocopy or monochromatic photocopy based on the judgment result. The full color key 90b is a key for setting the color photocopy. The black key 90c is a key for setting the monochromatic photocopy.

The image adjustment key 91 is constituted of an icon in which "image adjustment" is displayed. The image adjustment key 91 is a key to be touched by the user in performing setting to adjust the image. In a case where the image adjustment key 91 is touched, the CPU 51 displays, in the display section 22, a setting screen for setting color balance, RGB adjustment, image quality adjustment, substrate adjustment, sharpness, two-color photocopy and the like.

The draft mode setting portion 92 is a key for selecting a type of the image to be photocopied. The draft mode setting portion 92 is constituted of the character key 92a, the character picture key 92b, and the picture key 92c. The character key 92a is constituted of an icon in which "character" is displayed. The character picture key 92b is constituted of an icon in which "character picture" is displayed. The picture key 92c is constituted of an icon in which "picture" is displayed.

The character key 92a is a key to be selected in a case where the image to be photocopied is a binary image (image constituted of white or black pixels) or an image to be processed as the binary image. For example, since the image constituted of characters has less grey-level pixels, the image is preferably photocopied as the binary image. Therefore, in a case where the image to be photocopied is constituted of the characters, the character key 92a is selected.

The picture key 92c is a key to be selected in a case where the image to be photocopied is an image having multiple tone. For example, since an image such as a picture has many grey-level pixels, the image is preferably photocopied as the multiple-tone image. Therefore, when the image to be photocopied is constituted of the picture, the picture key 92c is selected.

The character picture key 92b is a key to be selected in a case where the image to be photocopied is an image mixed with the binary image and the multiple-tone image. For example, the character picture key 92b is selected in a case where the image to be photocopied is an image mixed with the characters and the picture.

The density adjustment portion 93 is constituted of keys for setting a photocopy density. The density adjustment portion 93 is constituted of the density down key 93a, the density up key 93b, the automatic density key 93c, and the density display portion 93d. The density down key 93a is constituted of an icon in which "←" is displayed. The density up key 93b is constituted of an icon in which "→" is displayed. The automatic density key 93c is constituted of an icon in which "automatic density" is displayed. In the density display portion 93d, the presently set photocopy density is displayed.

The density down key 93a is a key to be touched in a case where the photocopy density is reduced. Every time the density down key 93a is touched, the photocopy density is set to gradually decrease from the presently set photocopy density. The density up key 93b is a key to be touched in a case where the photocopy density is increased. Every time the density up key 93b is touched, the photocopy density is set to gradually increase from the presently set photocopy density. The automatic density key 93c is a key to be touched in a case where the photocopy density is set based on a predetermined reference value.

Moreover, in a case where the color mode setting portion 90, the image adjustment key 91, the draft mode setting portion 92, or the density adjustment portion 93 is touched, the CPU 51 performs processing to change the set contents in response to the input key, and the set contents are reflected in the basic screen 70.

Next, the setting check screen will be described.

As shown in FIG. 5, the setting check screen 100 (100a, 100b, 100c, or 100d) is constituted of display areas such as a guidance display area 101, a draft setting and sheet setting display area 102, and a set contents display area (icon display area) 103.

The setting check screen 100 is constituted of a layout similar to that of the basic screen 70. That is, the display area 101 is disposed in an upper part of the screen in the same manner as in the display area 71. The display area 102 is disposed in a left part of the screen in the same manner as in the display area 72. The display area 103 is disposed ranging from the center to a right part of the screen in the same manner as in the display area 73.

The display area 101 displays a photocopy magnification, a sheet size, a photocopy side (single-sided/double-sided), the number of sheets to be photocopied and the like in the same manner as in the display area 71 of the basic screen 70. The display area 101 displays a color mode, a density setting mode, a draft image mode and the like.

The display area 102 is constituted of a first display area 102a and a second display area 102b. The first display area 102a and the second display area 102b display contents similar to those displayed in the first display area 72a and the second display area 72b. That is, in the first display area 102a, a draft graphical image Og is displayed which indicates the present draft setting together with character information indicating the draft size. The second display area 102b displays a graphical image Pg of the finish which indicates the present sheet setting together with the character information indicating a sheet size.

In the display area 103, a magnification icon 111 is associated and displayed with the photocopy magnification displayed in the display area 101 by a triangular graphics or the like. The magnification icon 111 is an icon having display contents similar to those of the magnification key 81 displayed in the basic screen 70. A position where the magnification icon 111 is displayed in the setting check screen 100 corresponds to that of the magnification key 81 displayed in the basic screen 70. When the magnification icon 111 is touched, the display section 22 displays a magnification setting screen. That is, in a case where the magnification icon 111 is touched in the setting check screen 100, the digital multifunction peripherals 1 performs magnification set processing.

In the display area 103, a sheet icon 112 is associated and displayed with the sheet size displayed in the display area 101. The sheet icon 112 is an icon having display contents similar to those of the sheet key 82 displayed in the basic screen 70. A position where the sheet icon 112 is displayed in the setting check screen 100 corresponds to that of the sheet key 82 displayed in the basic screen 70. When the sheet icon 112 is touched, the display section 22 displays a sheet setting screen. That is, in a case where the sheet icon 112 is touched in the setting check screen 100, the digital multifunction peripherals 1 performs sheet set processing.

In the display area 103, a photocopy side icon 113 is associated and displayed with set contents of the photocopy side (single-sided/double-sided) displayed in the display area 101. The photocopy side icon 113 is an icon having display contents similar to those of the single-sided/double-sided key 83 displayed in the basic screen 70. A position where the sheet icon 112 is displayed in the setting check screen 100 corresponds to that of the sheet key 82 in the basic screen 70. When the photocopy side icon 113 is touched, the display section 22 displays a photocopy side setting screen. That is, in a case where the photocopy side icon 113 is touched in the setting check screen 100, the digital multifunction peripherals 1 performs photocopy side set processing.

Moreover, in the display area 103, a template registration key 114 and a closing key 115 are displayed.

The template registration key 114 is a key to be touched in a case where the present set contents being displayed are registered as a template. That is, when the template registration key 114 is touched, the CPU 51 performs template registration processing to register, as the template, the set contents displayed in the setting check screen 100. Accordingly, the user can instruct the registration of the template while checking detailed set contents. It is to be noted that the template registration processing will be described later in detail.

The closing key 115 is a key to be touched in a case where the setting check screen 100 is closed. When the user touches the closing key 115, the CPU 51 closes the setting check screen 100, and displays, in the display section 22, the basic screen 70 in which the set contents displayed in the setting check screen are reflected.

Furthermore, the setting check screen 100a shown in FIG. 4 is a display example of the setting check screen in a case where the finishing setting, the Nin1 setting, and response setting are not performed. When the finishing setting, the Nin1 setting, or the response setting is performed, as shown in FIGS. 5 to 7, in the setting check screens 100 (100b, 100c, and 100d), there are displayed a finishing setting icon 116, an Nin1 setting icon 117, and an application setting icon 118, respectively, in accordance with the set contents.

It is to be noted that when the various icons indicating the set contents cannot be displayed in one screen displayable by the display section 22, the setting check screen 100 displays a scroll bar 119 having an upward and downward direction as shown in FIGS. 5 to 7. An area to be scrolled by the scroll bar 119 is, for example, the icon display area 103. When a key indicating an upward direction is touched, the display contents are scrolled in the upward direction. When a key indicating a downward direction is touched, the display contents are scrolled in the downward direction. The area to be scrolled by the scroll bar 119 may be the whole icon display area 103, or the icon display area 103 where there is displayed an icon other than the magnification icon 111, the sheet icon 112, and the photocopy side icon 113. In a case where various icons indicating the set contents can be displayed in one screen displayable by the display section 22, the scroll bar 119 may not be displayed or may be displayed as whiteout.

When the stapling is set as one of the finishing functions, in the setting check screen 100, the finishing setting icon 116 is displayed which indicates that the stapling is set as one of the finishing functions as shown in the setting check screen 100b of FIG. 5.

In the finishing setting icon 116, "sort/stack/staple" is displayed in the same manner as in the finishing setting key 84 displayed in the basic screen 70, and the setting of "stapling" is emphasized and displayed. A position where the finishing setting icon 116 is displayed in the setting check screen 100 is displayed in a position corresponding to that of the finishing setting key 84 displayed in the basic screen 70. Such finishing setting icon 116 allows the user to intuitively and securely check that the stapling is set as one of the finishing functions.

Moreover, in a case where the finishing setting icon 116 is touched, a finishing setting screen is displayed in the display section 22. That is, when the finishing setting icon 116 is touched in the setting check screen 100, the digital multifunction peripherals 1 performs the finishing set processing.

Furthermore, in a case where 2in1 is set as the Nin1 setting, in the setting check screen 100, the Nin1 setting icon 117 is displayed which indicates that 2in1 is set in the same manner as in the setting check screen 100c shown in FIG. 6.

In the Nin1 setting icon 117, "2in1/4in1" is displayed in the same manner as in the Nin1 key 85 displayed in the basic screen 70, and the setting of "2in1" is emphasized and displayed. In the setting check screen 100, the Nin1 setting icon 117 is displayed in a position corresponding to that of the Nin1 key 85 displayed in the basic screen 70. Such Nin1 setting icon 117 allows the user to intuitively and securely check that 2in1 is set as one of the Nin1 functions.

Moreover, in a case where the Nin1 setting icon 117 is touched, an Nin1 setting screen is displayed in the display section 22. That is, when the Nin1 setting icon 117 is touched in the setting check screen 100, the digital multifunction peripherals 1 performs Nin1 set processing.

Furthermore, in a case where the inserted sheet (insertion of a special sheet) is set as the application setting, in the setting check screen 100, the application setting icon 118 is displayed which indicates that the inserted sheet (insertion of the sheet) is set as the application setting as in the setting check screen 100d of FIG. 7.

In the application setting icon 118, "sheet insertion" is displayed which indicates that the insertion of the sheet is set as one of the application settings. Moreover, it is emphatically displayed that "inserted sheet 1" is set as the sheet to be inserted. The application setting icon 118 in the setting check screen 100 is displayed in a position corresponding to that of the application setting key 86 displayed in the basic screen 70. Such application setting icon 118 allows the user to intuitively and securely check that the insertion of the sheet is set as the application setting.

Moreover, when the application setting icon 118 is touched, the display section 22 displays the application setting screen. In a case where the application setting icon 118 is touched in the setting check screen 100, the digital multifunction peripherals 1 performs the application set processing. It is to be noted that, as shown in FIG. 7, in a case where "sheet insertion" is displayed in the application setting icon 118, that is, the icon 118 is an icon indicating that the sheet insertion is set, when the icon 118 is touched, the display section 22 may display the setting screen of the sheet insertion which is the application setting.

As described above, in the digital multifunction peripherals having the display section in which the touch panel is built, the display section displays the setting check key for checking the present set contents together with a setting screen such as the basic screen for performing various basic settings. In a case where the user indicates the setting check key displayed in the setting screen, the digital multifunction peripherals displays, in the display section, the template registration key for registering the present set contents as the template together with the setting check screen displaying the present set contents. In a case where the template registration key is indicated, the digital multifunction peripherals performs processing to register the present set contents as the template.

Accordingly, it is possible to securely check the present set contents, and it is also possible to easily register the checked set contents as the template.

Next, there will be described processing from a time when photocopy is set until the photocopy processing is started.

Figure 8:
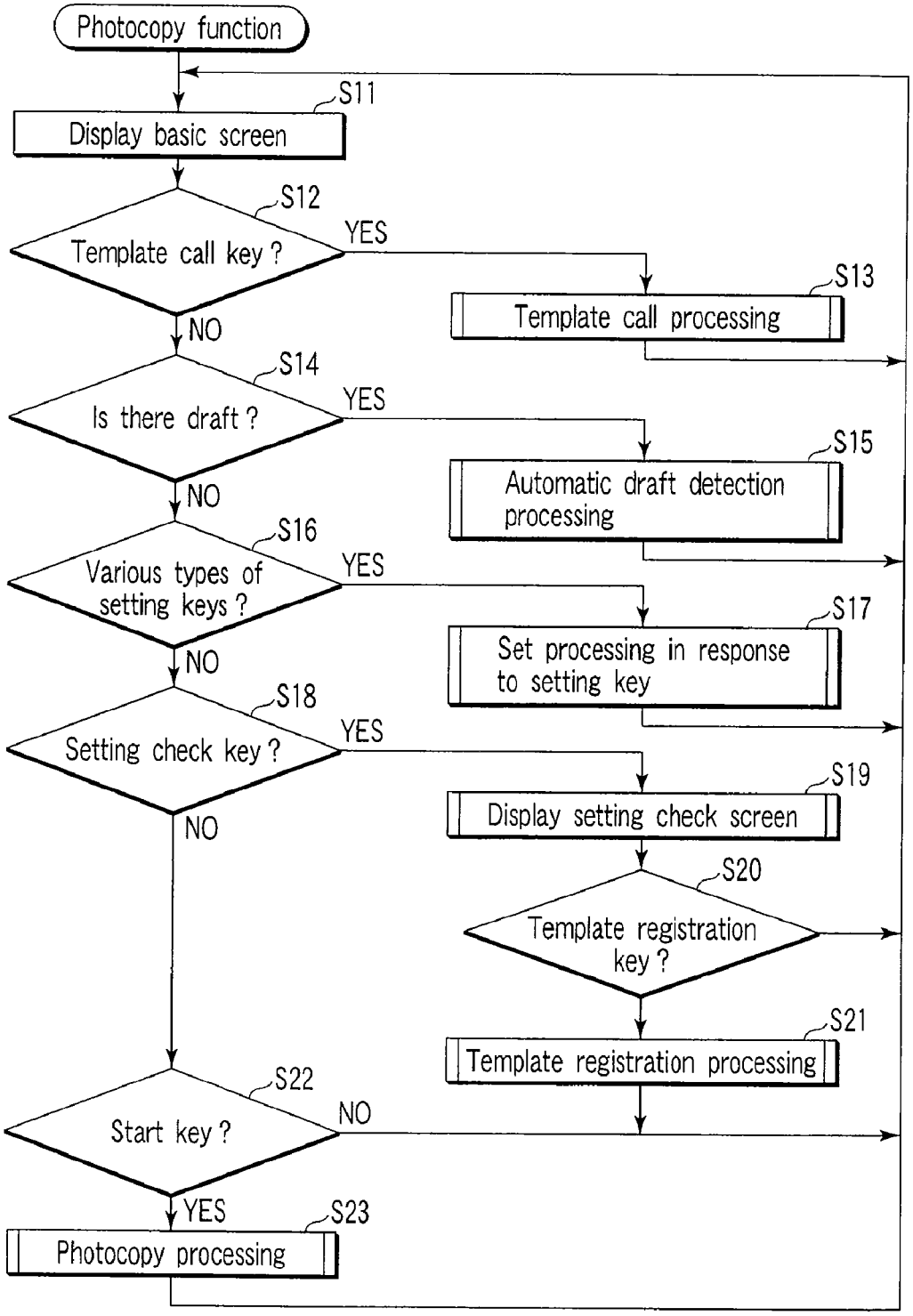
FIG. 8 is a flowchart schematically showing a flow of processing from a time when photocopy is set until photocopy processing is started.

FIG. 8 is a flowchart schematically showing a flow from the time when the photocopy is set until the photocopy processing is started.

In a case where the digital multifunction peripherals is brought into a photocopy mode, the CPU 51 of the system control unit 11 displays the basic screen 70 in the photocopy mode in the display section 22 of the operation panel 12 in a standby state (step S11).

When the user inputs the template call key 67 as the hardware key 21 in this state (step S12, YES), the CPU 51 of the system control unit 11 executes the template call processing (step S13). This template call processing is processing for calling the set contents stored as the template to set an operation based on the called set contents.

Moreover, in a state in which the basic screen 70 is displayed, the CPU 51 monitors whether or not there is any draft in the ADF 31 based on a detection signal of the detector 31b disposed in the ADF 31. On detecting that the draft is set in the ADF 31 (step S14, YES), the CPU 51 of the system control unit 11 judges the size of the draft set in the ADF 31 by the ADF draft size detecting function, and performs the automatic draft set processing based on the judged draft size (step S15).

It is to be noted that in a case where the draft size is designated by the user, the CPU 51 invalidates the ADF draft size detecting function, and the draft size detected by the ADF draft size detecting function is not reflected in the setting. In this case, even if the CPU 51 detects that the draft has been set in the step S14, the CPU may advance to step S16.

Moreover, when the user indicates various types of setting keys (e.g., the magnification key 81, the sheet key 82, the photocopy side key 83, the finishing setting key 84, the Nin1 key 85, the application setting key 86, the draft setting key 87, the color mode setting portion 90, the image adjustment key 91, the draft mode setting portion 92, the density adjustment portion 93, etc.) in the basic screen 70, the CPU 51 performs the set processing in response to the designated setting key (step S17).

It is to be noted that the contents set in the step S17 are held as setting information by the RAM 52 and the like. Every time the set contents are changed, the CPU 51 displays, in the display section 22, the basic screen or various types of setting screens in which the present set contents are reflected.

Moreover, in a case where the setting check key 89 is touched by the user in a state in which the basic screen 70 is displayed (step S18, YES), the CPU 51 displays, in the display section 22, the setting check screen 100 displaying the present set contents held in the RAM 52 (step S19).

In a case where the template registration key 114 is touched by the user in a state in which the setting check screen 100 is displayed (step S20), the CPU 51 performs the template registration processing to register, as the template, the set contents displayed in the setting check screen 100 (step S21). This template registration processing will be described later in detail.

Moreover, in a case where the start key as the hardware key 21 is touched by the user in a state in which the basic screen 70 or the setting check screen 100 is displayed (step S22, YES), the CPU 51 of the system control unit 11 executes the photocopy processing based on the present set contents (step S22).

Next, the template registration processing will be described.

Figure 9:
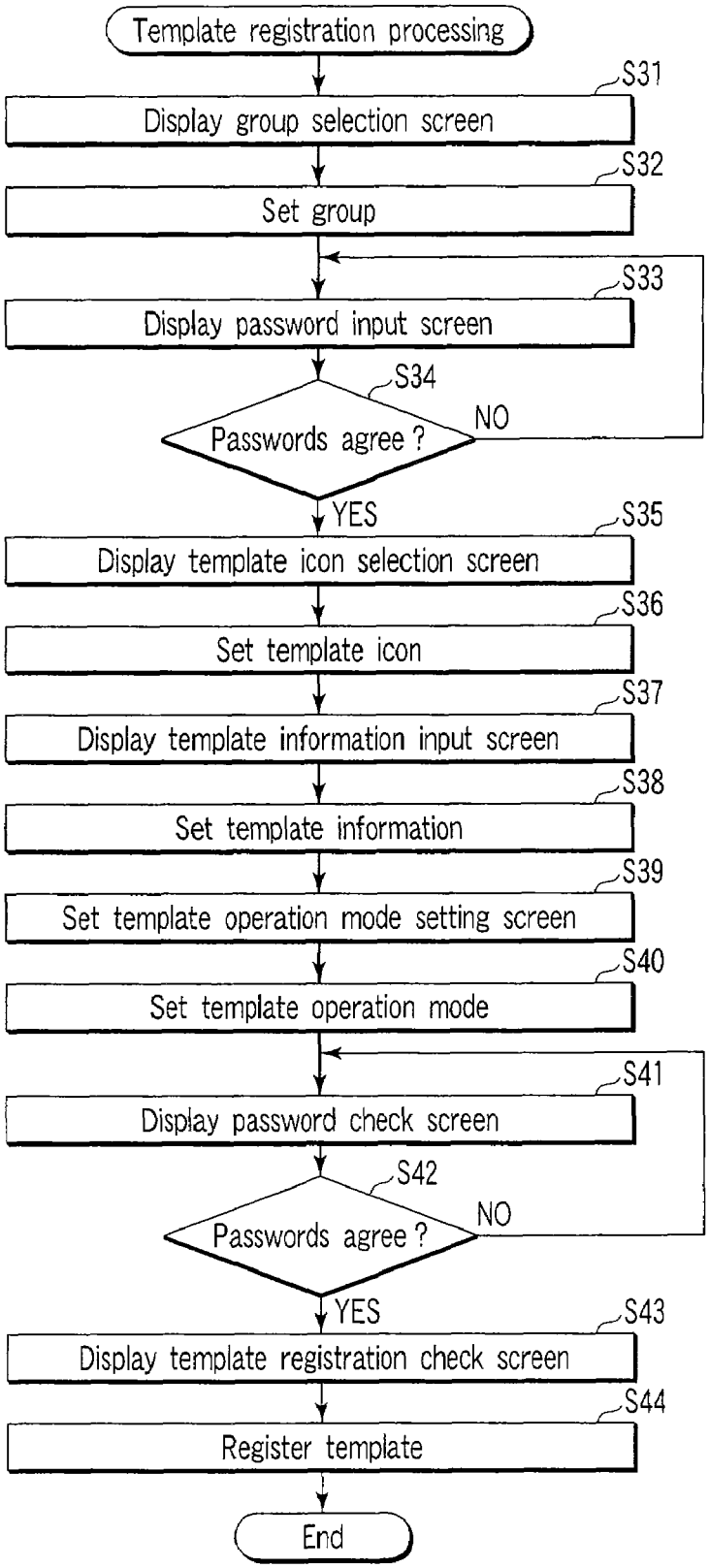
FIG. 9 is a flowchart showing a processing example of template registration processing.
Figure 10:
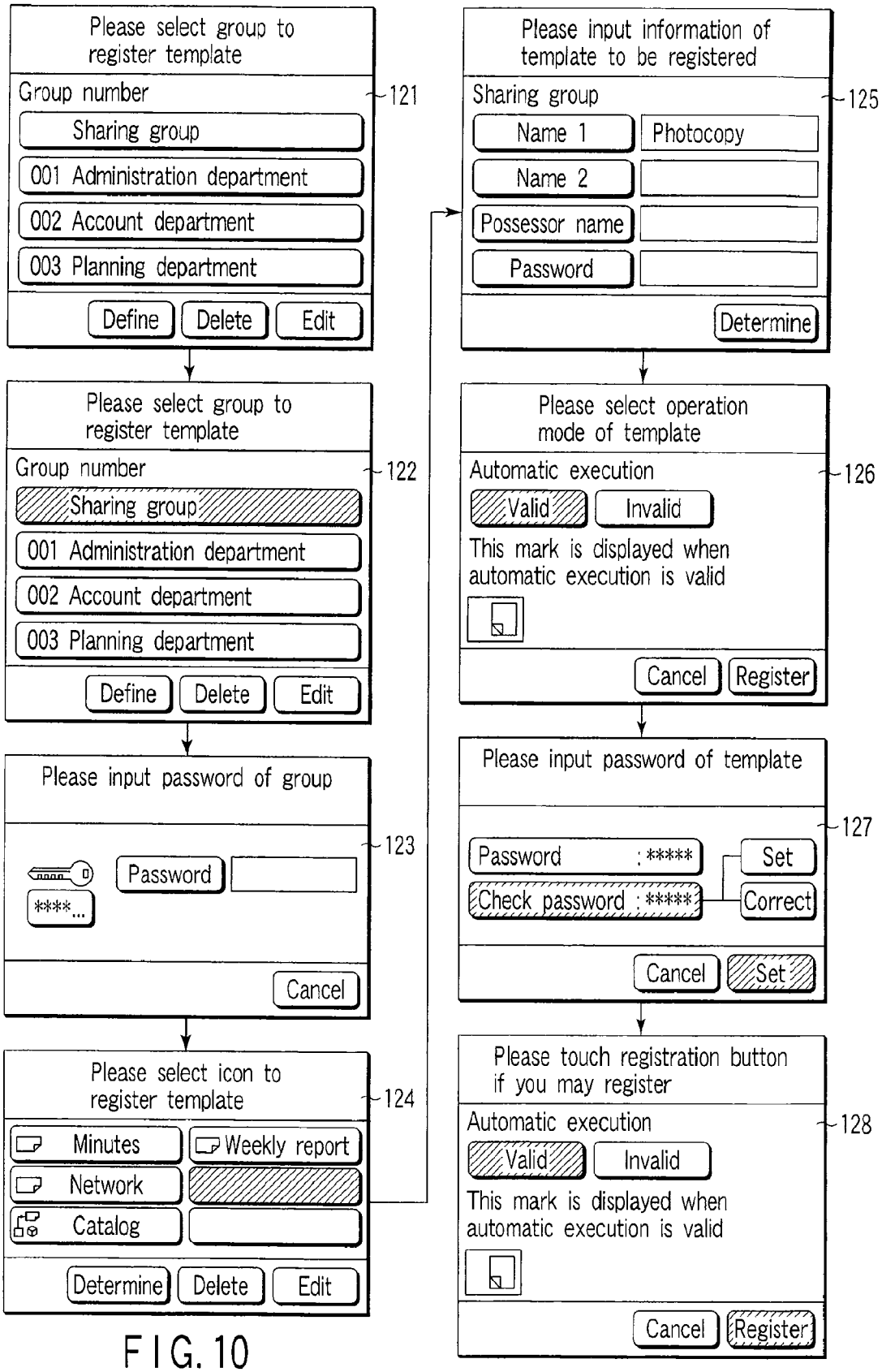
FIG. 10 is a diagram showing a display example in the template registration processing.

FIG. 9 is a flowchart showing a processing example of the template registration processing. FIG. 10 is a diagram showing transitional display examples in the template registration processing. FIG. 10 shows group selection screens 121, 122, a group password input screen 123, a template icon selection screen 124, a template information input screen 125, a template operation mode setting screen 126, a template password check screen 127, a registration check screen 128 and the like.

First, when the template registration key 114 is touched in the setting check screen 100, the CPU 51 displays, in the display section 22, the group selection screen 121 for selecting a group of templates to be registered (step S31). As shown in FIG. 10, the group selection screens 121, 122 displays an icon of each group together with a guidance on selecting the group. In such group selection screens 121, 122, the user touches the icon of the group whose template is to be registered.

For example, in a case where the user touches the icon displayed with "sharing group" in the group selection screen 121 of FIG. 10, the CPU 51 brings the icon into the selected state as shown in the group selection screen 122 of FIG. 10. When the user touches a determine key in this state, the group whose icon is displayed with "sharing group" is determined as the group whose template is to be registered. It is to be noted that to register the template in a newly prepared group, the user selects the icon whose group is not set, and inputs information on the group to be newly prepared.

In a case where the user touches the determine key in a state in which the icon of one group is selected as in the group selection screen 122, the CPU 51 sets the selected group to the template group to be registered (step S32). In a case where the template group to be registered is set, the CPU 51 displays, in the display section 22, the password input screen 123 for allowing the user to input a password of the selected group (step S33). It is to be noted that when any password is not set to the selected group, the CPU 51 omits steps S33 and S34, and advances to step S35.

This password input screen 123 displays a password input column together with a guidance on inputting the password of the selected group. The user inputs the password by use of the ten keys 63 and the like in a state in which such password input screen 123 is displayed. When the user inputs the password into this password input screen 123, the CPU 51 judges whether or not the input password agrees with the password of the selected group (step S34).

In a case where this judgment results in a judgment that both of the passwords agree with each other (step S34, YES), the CPU 51 displays the icon selection screen 124 for selecting the icon of the template to be registered (step S35).

Here, in a case where the present set contents are registered as a new template, the user touches an icon (empty icon) which is not associated with the existing template in the icon selection screen 124. It is to be noted that in a case where the present set contents are registered in the existing template, that is, the contents of the existing template are overwritten into the present set contents, the user touches the icon corresponding to the template to be overwritten.

In a case where the user touches the determine key in a state in which one icon is selected in the icon selection screen, the CPU 51 sets the selected icon to the icon of the template (step S36). When the icon of the template to be registered is set, the CPU 51 displays, in the display section 22, the template information input screen 125 for allowing the user to input information on the template to be registered in association with the icon (step S37). When the template information input screen 125 is displayed, the user inputs the information on the template along predetermined particulars, and touches the determine key.

When the template information is input, and the determine key is touched, the CPU 51 sets the input information as the information on the template to be registered (step S38). When the template information is set, the CPU 51 displays, in the display section 22, a template operation mode setting screen for setting an operation mode of the template (step S39).

Here, it is assumed that as the template operation mode, there are selectable a mode (automatic execution mode) to automatically execute the photocopy processing based on the set contents registered as the template and a mode (automatic execution invalid mode) to perform setting based on the set contents registered as the template. In a state in which such template operation mode setting screen is displayed, the user touches either an automatic execution key to set the automatic execution mode or an invalid key that invalidates the automatic execution.

When the user touches either the automatic execution key or the invalid key in the template operation mode setting screen, the CPU 51 sets the template operation mode in response to the touched key (step S40). When the operation mode of the template to be registered, the CPU 51 displays the template password check screen 127 for checking the password with respect to the template (step S41). It is to be noted that in a case where any password is not designated as the template information with respect to the template, the CPU 51 omits the steps S41 and S42, and advances to step S43.

This template password check screen 127 displays a password input column together with a guidance on inputting the password of the template to be registered for check. In a state in which such password check screen 127 is displayed, the user inputs the password of the template by use of the ten keys 63 and the like.

When the user inputs the password in this template password check screen 127, the CPU 51 judges whether or not the input password agrees with the password of the template to be registered (step S42). In a case where this judgment results in a judgment that both of the passwords agree with each other (step S42, YES), the CPU 51 displays the template registration check screen (step S43). In this template registration check screen, a registration key for instructing the registration of the template may be displayed. For example, as shown in FIG. 10, the template registration check screen may have a layout similar to that of the operation mode setting screen.

When the user touches the registration key for instructing the registration of the template in the template registration check screen, the CPU 51 performs processing to store the present set contents as the template in a storage device such as the HDD 55 (step S44). In this case, the user's designated group, icon, template information, and operation mode are set to register the template.

The above-described processing registers the present set contents as the template.

Next, the template call processing will be described.

Figure 11:
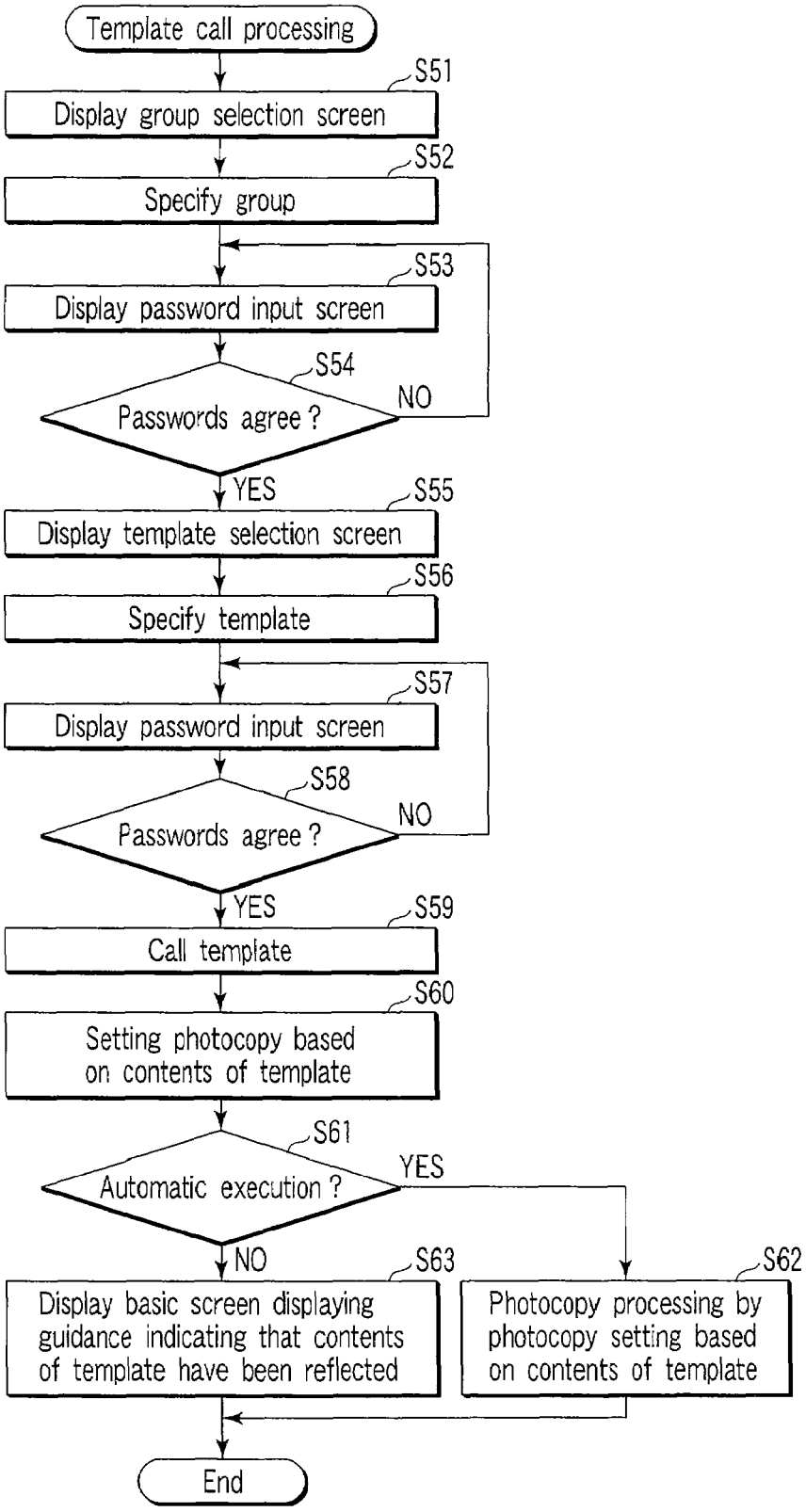
FIG. 11 is a flowchart showing a processing example of template call processing.
Figure 12:
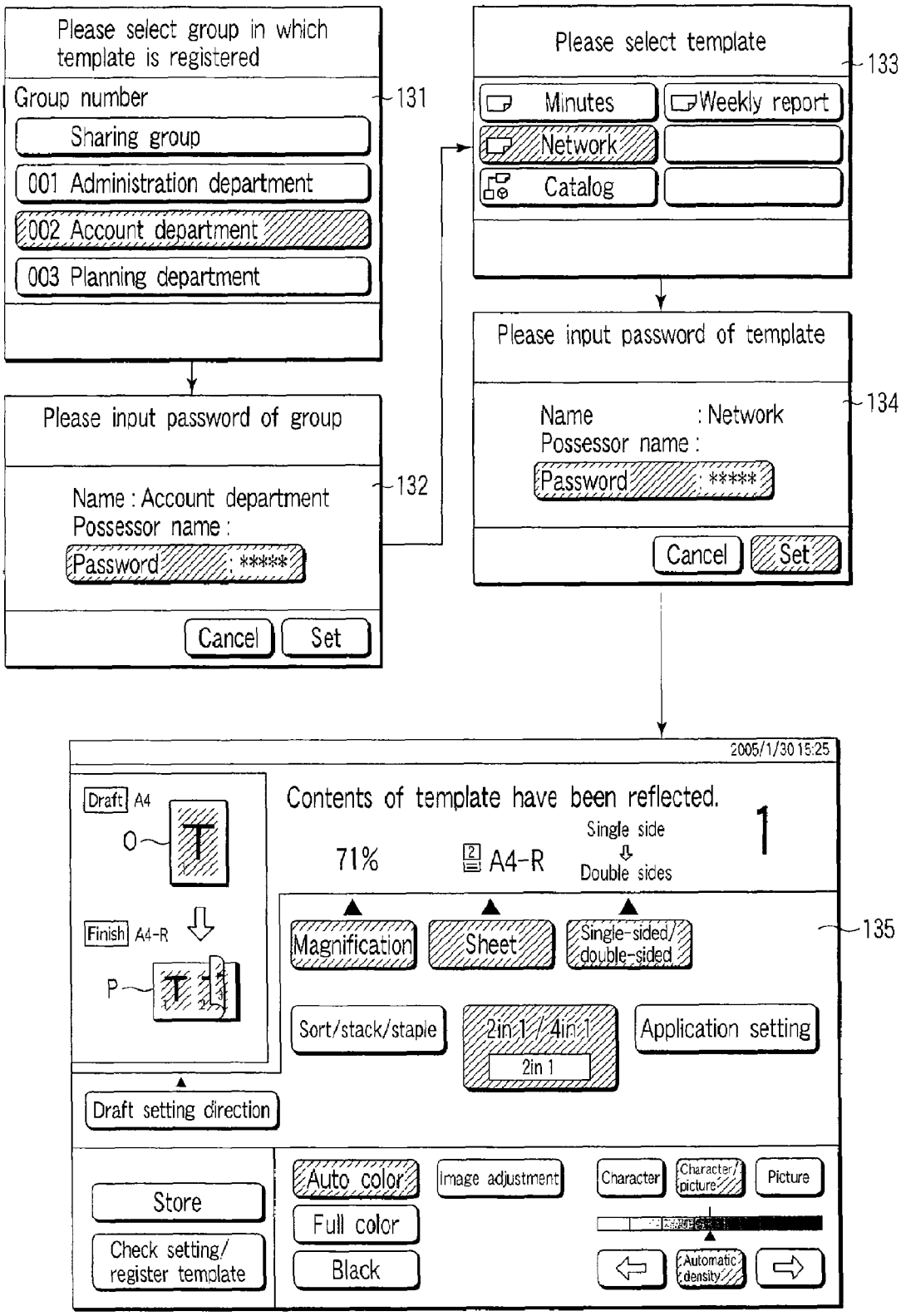
FIG. 12 is a diagram showing a display example in the template call processing.

FIG. 11 is a flowchart showing a processing example of the template call processing. FIG. 12 is a diagram showing transitional display examples of display screens in the template call processing. FIG. 12 shows a group selection screen 131, a password input screen 132, a template selection screen 133, a password input screen 134, a basic screen 135 and the like.

First, when the user touches the template call key 67 during the operation in the photocopy mode, the CPU 51 displays, in the display section 22, the group selection screen 131 for selecting each registered template group (step S51). As shown in FIG. 12, the group selection screen 131 displays each group icon together with a guidance on selecting the group to which a desired template belongs. In such group selection screen 131, the user touches the icon of the group in which the template is registered.

For example, in a case where the user touches the icon displayed with "account department" in the group selection screen 121 of FIG. 10, the CPU 51 brings the icon into the selected state. When the user touches a determine key in this state, the group whose icon is displayed with "account department" is determined (step S52).

In a case where the user touches the determine key in a state in which the icon of one group is selected as in such group selection screen 131, the CPU 51 displays, in the display section 22, the password input screen 132 for allowing the user to input a password of the selected group (step S53). It is to be noted that when any password is not set to the selected group, the CPU 51 omits steps S53 and S54, and advances to step S55.

This password input screen 132 displays a password input column together with a guidance on inputting the password of the selected group. The user inputs the password by use of the ten keys 63 and the like in a state in which such password input screen 132 is displayed. When the user inputs the password into this password input screen 132, the CPU 51 judges whether or not the input password agrees with the password of the selected group (step S54).

In a case where this judgment results in a judgment that both of the passwords agree with each other (step S54, YES), the CPU 51 displays the template selection screen 133 for selecting the desired template from the templates which belongs to the group (step S55).

As shown in FIG. 12, in this template selection screen 133, each template that belongs to the user's selected group is displayed as the icon. In the template selection screen, the user touches the icon of the desired template. When the user touches any template, the CPU 51 brings the touched icon into the selected state (step S56).

When the user touches the determine key in this state, the CPU 51 displays, in the display section 22, the password input screen 134 for allowing the user to input the password of the selected template (step S57). It is to be noted that in a case where any password is not set to the selected template, the CPU 51 omits the step S57 and step S58, and advances to step S59.

This password input screen 134 displays a password input column together with a guidance on inputting the password of the selected template. In a state in which such password input screen 134 is displayed, the user inputs the password by use of the ten keys 63 and the like. When the user inputs the password in this password input screen 134, the CPU 51 judges whether or not the input password agrees with the password of the selected template (step S58). In a case where this judgment results in a judgment that both of the passwords agree with each other (step S58, YES), the CPU 51 calls contents of the template (step S59).

When the contents of the selected template are called, the CPU 51 performs photocopy setting based on the contents of the template (step S60). The CPU 51 judges whether or not the operation mode of the template is the automatic execution mode (step S61). In a case where this judgment results in a judgment that the operation mode of the template is the automatic execution mode (step S61, YES), the CPU 51 completes the photocopy setting based on the contents of the template, and performs the photocopy processing (step S62).

Moreover, in a case where the above judgment results in a judgment that the operation mode of the template is not the automatic execution mode (step S61, NO), the CPU 51 performs the photocopy setting based on the contents of the template, and displays the basic screen 135 in which the contents set based on the template are reflected (step S63). As shown in FIG. 12, this basic screen 135 has a layout similar to that of the above-described basic screen 70, but the guidance display area 71 displays a guidance indicating that the contents of the template have been reflected. The above-described processing performs the template call processing.

In the digital multifunction peripherals, the key for registering the template is disposed separately from the key for calling the template. The template registration key for registering the template is displayed as the icon in the check screen for checking the set contents, and the template call key for calling the template is disposed as the hardware key. That is, the template registration key is displayed at an only appropriate timing in the display screen of the display section appropriately updated by user's setting operation and set contents checking operation.

In consequence, the operation of the template call processing can be performed at an arbitrary timing, and the operation of the template registration processing can be intuitively performed in an operation procedure close to a user's mental model. Since the operation for template registration processing is easy, the template function can be effectively and easily utilized.

It is to be noted that in the digital multifunction peripherals 1, the setting check screen for checking the set contents is displayed in the display section 22 in response to user's instruction even with respect to an operation mode other than the photocopy mode, such as a scan mode, a facsimile mode, or a filing mode. Even in such setting check screen in the operation mode other than the photocopy mode, the template registration key is displayed to register the displayed set contents as the template. In consequence, even with respect to various types of operation modes, the user can instruct the registration of the set contents as the template in the state in which the setting check screen is displayed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A multifunction peripheral to perform various types of processing based on set contents, the peripheral comprising:

a display unit which displays a screen;

an operation unit which inputs information;

a memory which stores information indicating the set contents as a template;

a first display control unit which displays various setting screens in the display unit;

a setting unit which performs setting based on setting information input by the operation unit, in a state in which the setting screen is displayed by the first display control unit;

a second display control unit which displays, in the display unit, a template registration key to register the set contents as the template together with a setting check screen displaying the set contents input by the operation unit; and a template registration unit which registers the set contents displayed in the setting check screen as the template in the memory, in a case where the second display control unit indicates the template registration key in the setting check screen displayed in the display unit, wherein the first display control unit displays, in the display unit, a setting check key to check present set contents together with the setting screen to input various set contents, and the second display control unit displays the setting check screen and the template registration key in the display unit, in a case where the first display control unit inputs the setting check key displayed in the display unit.

2. The multifunction peripheral according to claim 1, wherein the operation unit is constituted of a touch panel which detects a portion touched in a display screen of the display unit, and the second display control unit displays, in the display unit, the template registration key as an icon selectable by the touch panel as the operation unit.

3. The multifunction peripheral according to claim 1, further comprising:

a template call key which instructs calling of the template stored in the memory and which is different from the template registration key, wherein the setting unit performs the setting based on the set contents stored as the template in the memory, in a case where the template call key is indicated.

4. The multifunction peripheral according to claim 3, wherein the operation unit is constituted of a touch panel which detects a portion touched in a display screen of the display unit, the template call key is constituted of a hardware key disposed separately from the display unit and the operation unit, and the second display control unit displays, in the display unit, the template registration key as an icon selectable by the touch panel as the operation unit.

5. A multifunction peripheral having a display unit, an operation unit, and a memory, the peripheral comprising:

first display control means for displaying various setting screens in the display unit;

setting means for performing setting based on setting information input by the operation unit in a state in which the setting screen is displayed by the first display control means;

second display control means for displaying, in the display unit, a template registration key to store present set contents as a template together with a setting check screen displaying the present set contents; and template registration means for storing the set contents of the setting check screen displayed in the display unit as the template in the memory, in a case where the second display control means indicates the template registration key displayed by the display unit, wherein the first display control means displays, in the display unit, a setting check key to check the present set contents together with the setting screen to input various settings, and the second display control means displays the setting check screen and the template registration key in the display unit, in a case where the first display control means inputs the setting check key displayed in the display unit.

6. The multifunction peripheral according to claim 5, wherein the operation unit is constituted of a touch panel which detects a portion touched in a display screen of the display unit, and the second display control means displays, in the display unit, the template registration key as an icon selectable by the touch panel as the operation unit.

7. The multifunction peripheral according to claim 5, further comprising:

a template call key which instructs calling of the template stored in the memory and which is different from the template registration key, wherein the setting means performs the setting based on the set contents stored as the template in the memory, in a case where the template call key is indicated.

8. The multifunction peripheral according to claim 7, wherein the operation unit is constituted of a touch panel which detects a portion touched in a display screen of the display unit, the template call key is constituted of a hardware key disposed separately from the display unit and the operation unit, and the second display control means displays, in the display unit, the template registration key as an icon selectable by the touch panel as the operation unit.

9. A method of registering a template for use in a multifunction peripheral having a display unit, an operation unit, and a memory, the method comprising:

displaying various setting screens in the display unit;

performing setting based on setting information input by the operation unit in a state in which the setting screen is displayed by the display unit;

displaying, in the display unit, a template registration key to store present set contents as a template in the memory together with a setting check screen displaying the present set contents; and storing the set contents of the setting check screen displayed in the display unit as the template in the memory, in a case where the template registration key is indicated, wherein the displaying of the setting screen comprises displaying, in the display unit, a setting check key to check the present set contents together with the setting screen to input various settings, and the displaying of the template registration key comprises displaying the setting check screen and the template registration key in the display unit, in a case where there is input the setting check key displayed together with the setting screen in the display unit.

10. The template registering method according to claim 9, wherein the operation unit is constituted of a touch panel which detects a portion touched in a display screen of the display unit, and the displaying of the template registration key comprises displaying, in the display unit, the template registration key as an icon selectable by the touch panel as the operation unit.

11. The template registering method according to claim 9, wherein the peripheral further comprises a template call key which instructs calling of the template stored in the memory and which is different from the template registration key, and the setting comprises performing the setting based on the set contents stored as the template in the memory, in a case where the template call key is indicated.

12. The template registering method according to claim 11, wherein the operation unit is a touch panel which detects a portion touched in a display screen of the display unit, the template call key is a hardware key disposed separately from the display unit and the operation unit, and the displaying of the template registration key comprises displaying, in the display unit, the template registration key as an icon selectable by the touch panel as the operation unit.

*13. An image forming apparatus having configurable settings that can be set by a user and registered as a template, comprising:*

*an operation panel having a touch panel;*

*a non-volatile memory; and*

*a template registration unit configured to display on the touch panel a first user interface that displays all of the configurable settings of the image forming apparatus as set by the user and a template registration key, and a second user interface that includes icons representing storage locations in the non-volatile memory in any one of which the configurable settings of the image forming apparatus as set by the user can be stored,*

*wherein the template registration unit is configured to detect a selection of one of the icons and to store the configurable settings of the image forming apparatus as set by the user as a template in a storage location in the non-volatile memory corresponding to the selected icon.*

*14. The image forming apparatus according to claim 13, wherein the icons include a first icon corresponding to an empty storage location and a second icon corresponding to a used storage location.*

*15. The image forming apparatus according to claim 13, further comprising a touch panel control unit configured to display a key by which a template registration process can be initiated.*

*16. The image forming apparatus according to claim 15, wherein the first user interface further displays a template cancel key, by which the template registration process can be cancelled.*

*17. The image forming apparatus according to claim 13, further comprising a template call key by which the configurable settings of the image forming apparatus stored in the non-volatile memory can be retrieved.*

*18. The image forming apparatus according to claim 17, wherein the template registration unit configures the image forming apparatus in accordance with the retrieved configurable settings.*

*19. In an image forming apparatus having configurable settings that can be set by a user and stored as a template, a method of registering a template to be used in operating the image forming apparatus, the method comprising the steps of:*

*storing configurable settings of the image forming apparatus as they are changed in accordance with user selections;*

*displaying all of the configurable settings of the image forming apparatus as set by the user and a template registration key;*

*displaying storage locations in any one of which the configurable settings of the image forming apparatus as set by the user can be stored;*

*receiving a selection of one of the storage locations; and*

*storing the configurable settings of the image forming apparatus as set by the user in the selected storage location.*

*20. The method according to claim 19, wherein the storage locations are displayed as icons.*

*21. The method according to claim 20, wherein the icons include a first icon conesponding to an empty storage location and a second icon corresponding to a used storage location.*

*22. The method according to claim 19, wherein a key to cancel the template registration process is displayed with the configurable settings of the image forming apparatus as set by the user and the template registration key.*

*23. The method according to claim 19, wherein the image forming apparatus includes a non-volatile memory unit, and the displayed storage locations correspond to storage locations in the non-volatile memory unit.*

*24. The method according to claim 23, wherein the storage locations in the non-volatile memory unit are displayed to a user for selection when a template call key is touched by the user.*

*25. A method of managing a template for an image forming apparatus having a touch panel, a volatile memory unit, a non-volatile memory unit, and configurable settings that can be set by a user and stored as a template in the non-volatile memory unit, the method comprising the steps of:*

*setting the configurable settings of the image forming apparatus to operate in a certain manner, all of the configurable settings of the image forming apparatus as set being stored in the volatile memory unit and being displayed on the touch panel with a template registration key; and*

*touching the template registration key that is displayed on the display unit with all of the configurable settings of the image forming apparatus as set and selecting a storage location in the non-volatile memory unit, to store the configurable settings of the image forming apparatus in the selected storage location in the non-volatile memory unit.*

*26. The method according to claim 25, wherein the step of selecting includes:*

*selecting one of a plurality of icons that are displayed on the touch panel,*

*wherein each of the icons represents a different storage location in the non-volatile memory unit.*

*27. The method according to claim 26, wherein the plurality of icons include a first icon corresponding to an empty storage location and a second icon corresponding to a used storage location.*

*28. The method according to claim 27, wherein the first icon is selected.*

*29. The method according to claim 27, wherein the second icon is selected.*

*30. The method according to claim 25, further comprising the step of touching a key displayed on the touch panel of the image processing apparatus to initiate a template registration process.*

*31. The method according to claim 30, wherein a key to cancel the template registration process is displayed on the touch panel with the template registration key.*

*32. The method according to claim 25, further comprising the step of touching a key to recall a registered template.*

* * * * *

UNITED STATES PATENT AND TRADEMARK OFFICE

CERTIFICATE OF CORRECTION

PATENT NO. : RE43,448 E
APPLICATION NO. : 12/822098
DATED : June 5, 2012
INVENTOR(S) : Kimoto et al.

It is certified that error appears in the above-identified patent and that said Letters Patent is hereby corrected as shown below:

Column 23, line 11: replace --conesponding-- with “corresponding”.

Signed and Sealed this
Fourth Day of September, 2012

David J. Kappos

David J. Kappos
*Director of the United States Patent and Trademark Office*